(12) United States Patent  (10) Patent No.: US 7,531,251 B2
Kanagawa et al.  (45) Date of Patent: May 12, 2009

(54) MAGNETIC RECORDING MEDIUM

(75) Inventors: Ichiro Kanagawa, Miyagi (JP);
Kazuhiko Suzuki, Miyagi (JP); Ryoichi Hiratsuka, Miyagi (JP); Hidetoshi Honda, Miyagi (JP)

(73) Assignee: Sony Corporation, Tokyo (JP)

( * ) Notice: Subject to any disclaimer, the term of this patent is extended or adjusted under 35 U.S.C. 154(b) by 526 days.

(21) Appl. No.: 11/329,668

(22) Filed: Jan. 11, 2006

(65) Prior Publication Data

US 2006/0154114 A1   Jul. 13, 2006

(30) Foreign Application Priority Data

Jan. 13, 2005  (JP)  ............... P2005-006823
Nov. 4, 2005  (JP)  ............... P2005-321053

(51) Int. Cl.
*G11B 5/66*  (2006.01)

(52) U.S. Cl. ................................................ 428/837
(58) Field of Classification Search ............... None
See application file for complete search history.

(56) References Cited

U.S. PATENT DOCUMENTS

| | | | | |
|---|---|---|---|---|
| 5,795,642 A | * | 8/1998 | Ishikawa et al. | 428/141 |
| 5,989,680 A | * | 11/1999 | Wakana et al. | 428/141 |
| 6,071,609 A | * | 6/2000 | Furutani et al. | 428/332 |
| 6,376,043 B1 | * | 4/2002 | Handa et al. | 428/141 |

OTHER PUBLICATIONS

English abstract of JP 56-016939.*

* cited by examiner

*Primary Examiner*—Holly Rickman
(74) *Attorney, Agent, or Firm*—Sonnenschein Nath & Rosenthal LLP

(57) ABSTRACT

A magnetic recording medium includes a nonmagnetic support having a thickness less than 7 μm and a width of 8 mm; a ferromagnetic metal layer disposed on a surface of the nonmagnetic support; and a reinforcing layer disposed on the other surface of the nonmagnetic support. The magnetic recording medium has a flexural rigidity EI of $5.9 \times 10^{-8}$ to $1.3 \times 10^{-7}$ N·m ($6.0 \times 10^{-4}$ to $1.3 \times 10^{-3}$ g·cm). The flexural rigidity EI is determined by the following equation:

$$EI = (\pi/4 - 2/\pi) \cdot W \cdot a^3 / d \cdot b \times 9.8 \times 10^{-5}$$

(wherein W is a load that causes an annular test piece having a radius of a cm and a width of b cm which is prepared by cutting a magnetic sheet formed of the magnetic recording medium to undergo a radial displacement d of $0.2\pi a$).

5 Claims, 12 Drawing Sheets

MAGNETIC RECORDING MEDIUM

CROSS REFERENCES TO RELATED APPLICATIONS

The present invention contains subject matter related to Japanese Patent Application JP 2005-006823 filed in the Japanese Patent Office on Jan. 13, 2005 and Japanese Patent Application JP 2005-321053 filed in the Japanese Patent Office on Nov. 4, 2005, the entire contents of which are incorporated herein by reference.

BACKGROUND OF THE INVENTION

1. Field of the Invention

The present invention relates to magnetic recording media having a thin-metal-film recording layer, and particularly to thin-metal-film magnetic recording media for high-density magnetic recording which are suitable as video tapes for long-time recording and high-capacity tape streamers.

2. Description of the Related Art

Coating-type magnetic recording media are widely known for use as audio tapes and video tapes. These magnetic media are produced by applying a magnetic coating material to a nonmagnetic support and drying it. The coating material is prepared by dispersing a magnetic powder, such as a magnetic oxide powder or a magnetic alloy powder, into a binder, such as a vinyl chloride-vinyl acetate copolymer, a polyester resin, a urethane resin, or a polyurethane resin.

On the other hand, thin-metal-film magnetic recording media have recently been proposed with increasing demand for higher-density recording. These magnetic recording media are produced by forming a magnetic layer on a nonmagnetic support directly or with an extremely thin adhesive layer disposed therebetween by plating or vacuum film formation processes such as vacuum deposition, sputtering, and ion plating. The magnetic layer is formed of a magnetic metal material such as a CoNi-based alloy, a CoCr-based alloy, or CoO.

This type of magnetic recording medium has various advantages. For example, this magnetic recording medium has high coercivity and high remanence ratio, and exhibits excellent electromagnetic conversion characteristics at short wavelengths because the media includes a significantly thin magnetic layer. In addition, the magnetic recording medium exhibits significantly small recording demagnetization and extremely low thickness loss in playback. Furthermore, the magnetic layer of the magnetic recording medium contains ferromagnetic metal particles at high fill densities because a binder, which is a nonmagnetic material, is not contained in the magnetic layer, unlike coating-type magnetic recording media.

In addition, oblique deposition, that is, the deposition of a magnetic layer at an oblique angle, has been proposed and put to practical use to improve electromagnetic conversion characteristics and thus produce higher output.

For thin-metal-film magnetic recording media as described above, techniques such as the formation of a protective layer on a magnetic layer and the formation of a back layer on a main surface opposite a magnetic layer are commonly employed to improve, for example, durability and running properties.

Furthermore, thin-metal-film magnetic recording media with smoother surfaces have been produced to reduce spacing loss with increasing recording density. A smoother surface, however, has an increased contact area with a magnetic head, thus causing larger friction and shear stress on the magnetic layer. Accordingly, it is important to protect the magnetic layer from such severe sliding conditions by forming a protective layer thereon.

A back layer functions to reduce the dielectric constant of the surface of a nonmagnetic support, inhibit defective running due to charging, improve the durability of the nonmagnetic support, and protect the magnetic tape from being damaged by the friction of a running head or the tape itself.

One of the most frequently used materials for supports for thin-metal-film magnetic recording media is polyethylene terephthalate (PET) films; particularly, PET films with a thickness of about 7 to 10 μm are used for supports for home video cassette tapes such as 8 mm tapes, and PET films with a thickness of about 5 to 7 μm are used for tape streamers for data backup of computers.

In recent years, more compact magnetic recording media that enable longer-time recording for video cassettes have been demanded as more compact video cassettes are produced. On the other hand, tape streamers with higher capacities have been demanded with recent increases in the amount of information. Accordingly, thinner magnetic recording media have been studied to meet such demands. In particular, the capacities of tape streamers have been doubled every few years, and thus thinner magnetic recording media have been demanded to achieve higher capacities.

A simple approach to reducing the thickness of a magnetic recording medium is to reduce the thickness of a support; however, the strength of a support formed of a PET film decreases in the longitudinal or width direction with decreasing thickness. Decreased strength in the longitudinal direction causes the magnetic recording medium to readily deform during the running on a video cassette recorder or drive.

In addition, decreased strength in the width direction causes problems such as wrinkles, folds, and defective contacts with heads. To overcome the problems, polyethylene naphthalate films and polyamide films have been studied and put to practical use as supports for magnetic recording media.

Polyethylene naphthalate films and polyamide films feature high Young's modulus and high heat resistance compared to PET films. The high Young's modulus of the films allows a support for a magnetic recording medium to have a smaller thickness. These films have thus attracted attention as supports for magnetic recording media capable of providing video cassette tapes for longer-time recording and tape streamers with higher capacities.

Stiffness, however, is proportional to the cube of thickness; for example, an eightfold increase in the Young's modulus of the material for a support is required to halve the thickness of the support while maintaining the same stiffness. Accordingly, a simple reduction in the thickness of a support results in unsatisfactory mechanical strength.

Japanese Unexamined Patent Application Publication Nos. 56-16939 (Patent Document 1), 58-97131 (Patent Document 2), 57-78627 (Patent Document 3), and 57-37737 (Patent Document 4), for example, propose thin-metal-film magnetic recording media having a reinforcing layer disposed on the back surface of a nonmagnetic support to compensate for decreased stiffness as a result of a reduction in the thickness of the nonmagnetic support. According to the proposals, a back layer formed of a thin metal film can improve the Young's modulus, running properties, curl resistance, and mechanical strength, for example, of a medium.

The magnetic recording media according to the above publications, however, are not designed to achieve the optimum Young's modulus, and thus cause problems including decreased output and defective envelopes due to poor head touch and tape damage such as edge folding and single-side stretching. In addition, the magnetic recording media cause skew after storage, or cause cracks and shavings on magnetic layers, increased amounts of wear, and increased dropouts after running.

Japanese Examined Patent Application Publication No. 7-60503 (Patent Document 5), for example, has recently proposed an 8 mm video tape having a flexural rigidity EI controlled within a predetermined range. According to the publication, the video tape exhibits significantly high running stability, good head touch, little output decrease, and few defective envelopes.

SUMMARY OF THE INVENTION

The above invention, however, is based on the premise that it is applied to 8 mm video tapes; without the premise, the magnetic recording medium can cause the problem of poor head touch. In particular, while thinner magnetic recording media have recently been developed to meet the demand for tape streamers with higher capacities, the settings of drives have been changed so that they can run tapes with thicknesses never before assumed. It has become clear that the above invention no longer matches such current systems.

In addition, systems including a magnetoresistance (MR) head or a giant magnetoresistance (GMR) head, which are being put to practical use, are less tolerant of head wear than those including currently used inductive heads because MR heads and GMR heads have smaller head depths than inductive heads. Accordingly, known techniques have difficulty in supporting such new systems, and thus magnetic recording media adapted to the new systems are demanded.

Furthermore, Patent Document 5 does not regard a carbon protective layer as a component of a magnetic recording medium, and thus no sufficient consideration is given to the effect of the carbon protective layer, particularly to head wear, an important factor in the use of MR heads and GMR heads. Also, no consideration is given to the requirements for surface roughness, which should be one of the main parameters for head wear. The above invention therefore seems to be no longer effective in view of the current technology. Envelopes, which have so far been considered only for self-playback/self-recording, should also be considered in practice for simultaneous use of commercially available tapes. Such use, however, is not verified, and thus a proposal adapted to the current technology is also desired in view of simultaneous use of different tapes.

In light of the above problems in the related art, it is desirable to provide an 8 mm thin-metal-film magnetic recording medium including a thin-film support provided with a predetermined reinforcing layer for optimizing the mechanical strength of the medium, particularly flexural rigidity or Young's modulus, to eliminate output decreases and defective envelopes with improved head touch, eliminate tape damage such as edge folding and single-side stretching, eliminate skew after storage and cracks and shavings on a magnetic layer after running, and reduce the amount of head wear and the error rate of the medium.

The present inventors have clarified problems that are not covered by the technology at the time when the invention according to Patent Document 5 was created, and have newly studied the requirements for magnetic tapes. To solve the problems, specifically, intensive studies have been made on thin-metal-film magnetic recording media having a reinforcing layer disposed on the back surface of a nonmagnetic support to achieve the optimum mechanical strength at low cost while reducing the thickness of the support to increase the recording density per unit volume. The studies also focus on the properties associated with head wear, including surface roughness, the thickness of a protective layer, and mechanical strength, thus completing the present invention.

A magnetic recording medium according to an embodiment of the present invention includes a nonmagnetic support having a thickness less than 7 μm and a width of 8 mm; a ferromagnetic metal layer disposed on a surface of the nonmagnetic support; and a reinforcing layer disposed on the other surface of the nonmagnetic support. The magnetic recording medium has a flexural rigidity EI of $5.9 \times 10^{-8}$ to $1.3 \times 10^{-7}$ N·m ($6.0 \times 10^{-4}$ to $1.3 \times 10^{-3}$ g·cm). The flexural rigidity EI is determined by the following equation:

$$EI = (\pi/4 - 2/\pi) \cdot W \cdot a^3/d \cdot b \times 9.8 \times 10^{-5}$$

(wherein W is a load that causes an annular test piece having a radius of a cm and a width of b cm which is prepared by cutting a magnetic sheet formed of the magnetic recording medium to undergo a radial displacement d of 0.2πa).

The reinforcing layer is preferably formed of a material selected from the group consisting of metals, metalloids, alloys, oxides thereof, and compounds thereof. In particular, the reinforcing layer preferably has a thickness of 20 to 300 nm.

The magnetic recording medium preferably further includes a carbon protective layer disposed on the magnetic layer. In particular, the carbon protective layer preferably has a thickness of 4 to 25 nm. In addition, the magnetic recording medium preferably has a ten-point average surface roughness SRz of 90 nm or less.

According to the above embodiment of the present invention, the reinforcing layer formed on the nonmagnetic support optimizes the mechanical strength, particularly flexural rigidity or Young's modulus, of the magnetic recording medium. Even if the nonmagnetic support is formed of PET, which is less expensive and has low mechanical strength, and its thickness is decreased, the magnetic recording medium can maintain sufficient mechanical strength to provide better RF envelopes and lower error rates. This magnetic recording medium can therefore achieve high capacity, high performance, and high reliability.

DESCRIPTION OF THE PREFERRED EMBODIMENTS

Magnetic recording media according to embodiments of the present invention will now be described.

Figure 1:
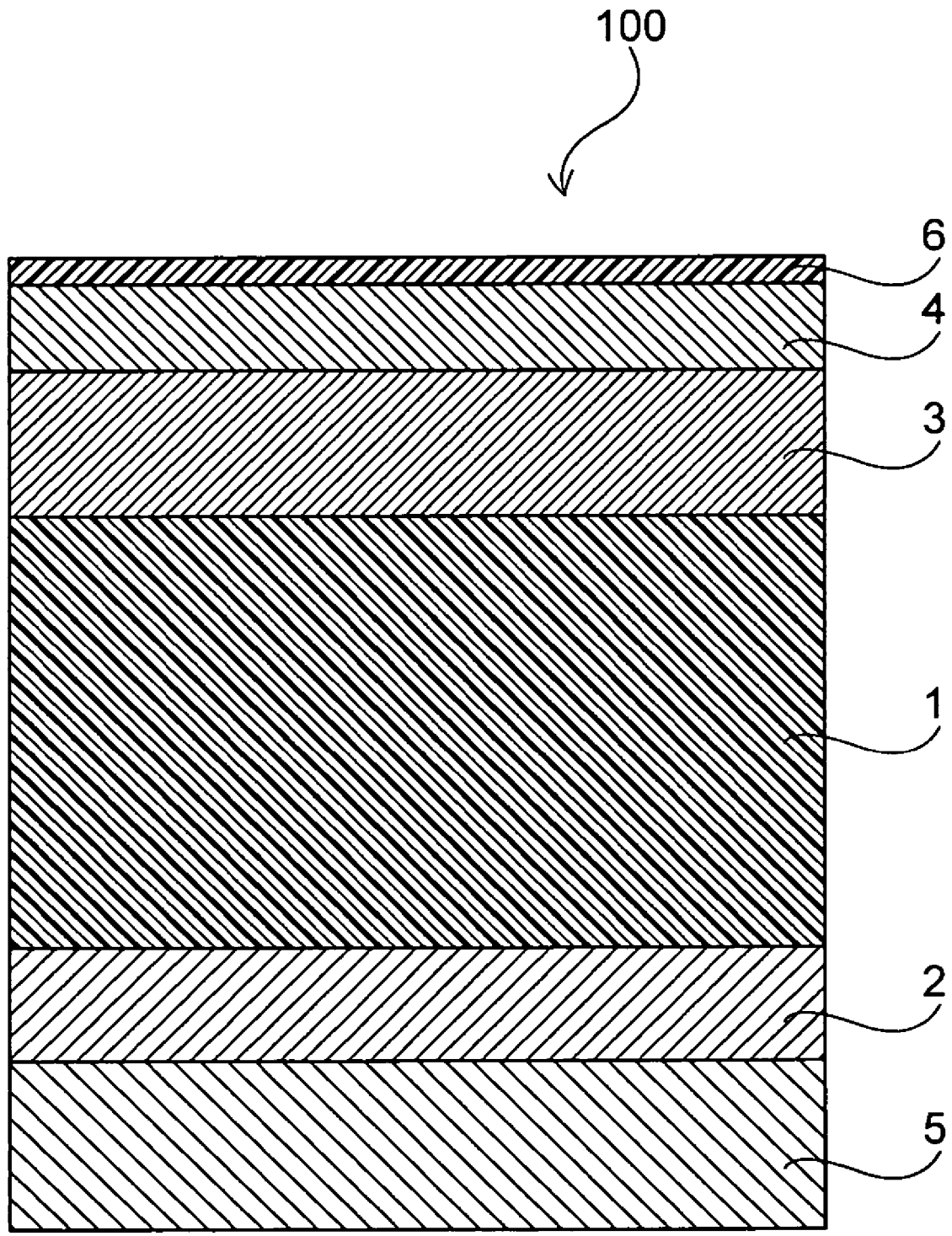
FIG. 1 is a schematic diagram of a magnetic recording medium according to an embodiment of the present invention.

FIG. 1 is a schematic sectional view of a thin-metal-film magnetic recording medium according to an embodiment of the present invention. A thin-metal-film magnetic recording medium 100 includes a nonmagnetic support 1, a reinforcing layer 2 formed on a main surface of the nonmagnetic support 1 by a vacuum film formation process, and a backcoat layer 5 formed on the reinforcing layer 2 by a wet coating process. The reinforcing layer 2 is formed of a material selected from the group consisting of metals, metalloids, alloys, oxides thereof, and compounds thereof. The thin-metal-film magnetic recording medium 100 further includes a magnetic layer 3 formed on the other main surface of the nonmagnetic support 1 by a vacuum film formation process, a carbon protective layer 4 formed on the magnetic layer 3 by a vacuum film formation process, and a lubricating layer 6 formed on the carbon protective layer 4 by a wet process. The magnetic layer 3 is formed of a ferromagnetic metal or an alloy thereof.

The individual layers of the thin-metal-film magnetic recording medium 100 according to the embodiment of the present invention are described below in detail.

The nonmagnetic support 1 has an elongated shape and may be formed of any known material that is generally used as a substrate for magnetic tapes. Examples of the material used include polyethylene terephthalate (PET), polyethylene naphthalate (PEN), polytetramethylene terephthalate, poly(1,4-cyclohexylenedimethylene terephthalate), polyethylene-2,6-naphthalene dicarboxylate, polyethylene-p-oxybenzoate, and polyamide (PA). In particular, PET and PEN are preferred in terms of availability and processability. The polyester used may be either a homopolyester or a copolyester.

For known magnetic tapes, a nonmagnetic support generally having a thickness of 5 to 15 μm is used to ensure sufficient mechanical strength and running stability. The thickness of the nonmagnetic support can be further reduced if sufficient mechanical strength in the running of a magnetic recording medium can be achieved by methods other than increasing the strength of the nonmagnetic support itself. From this viewpoint, the thickness of the nonmagnetic support 1 can be reduced to less than 7 μm, for example 4 μm, for the thin-metal-film magnetic recording medium 100.

If a polyester film, such as a polyethylene terephthalate film, having a thickness of 7 μm or more is used, the reinforcing layer 2 has a less effect of enhancing flexural rigidity. An increase in the thickness of the polyester film, namely the nonmagnetic support 1, enhances the rigidity of the nonmagnetic support 1 itself because flexural rigidity is generally proportional to the cube of thickness. This results in a relative decrease in the rate of increase in rigidity by the reinforcing layer 2.

A polyester film having a thickness less than 2 μm basically has excessively low flexural rigidity. Despite the increase in rigidity by the reinforcing layer 2, the film has difficulty in achieving sufficient rigidity for practical use as the nonmagnetic support 1 for the thin-metal-film magnetic recording medium 100. Accordingly, the nonmagnetic support 1 for the thin-metal-film magnetic recording medium 100 according to this embodiment preferably has a thickness of 2 μm to less than 7 μm.

The reinforcing layer 2 is deposited on one main surface of the nonmagnetic support 1 by a vacuum film formation process. The reinforcing layer 2 is formed of a material selected from the group consisting of metals, metalloids, alloys, oxides thereof, and compounds thereof.

Examples of the material for the reinforcing layer 2 include metals such as Al, Cu, Zn, Sn, Ni, Ag, Co, Fe, and Mn; metalloids such as Si, Ge, As, Sc, and Sb; and oxides thereof. Examples of the alloys of the metals and metalloids include FeCo, FeNi, CoNi, FeCu, CoCu, CoAu, CoY, CoLa, CoPr, CoGd, CoSm, CoPt, NiCu, MnBi, MnSb, MnAl, FeCr, CoCr, NiCr, FeCoCr, and NiCoCr. The oxides of the metals, the metalloids, and the alloys can readily be produced by, for example, introducing oxygen gas during the deposition. Examples of the compounds of the metals, the metalloids, and the alloys include FeSiO, SiC, SiN, CuAlO, SiNO, and SiCO.

The reinforcing layer 2 preferably has a thickness of 20 to 300 nm, for example 100 nm, in terms of productivity.

Figure 2:
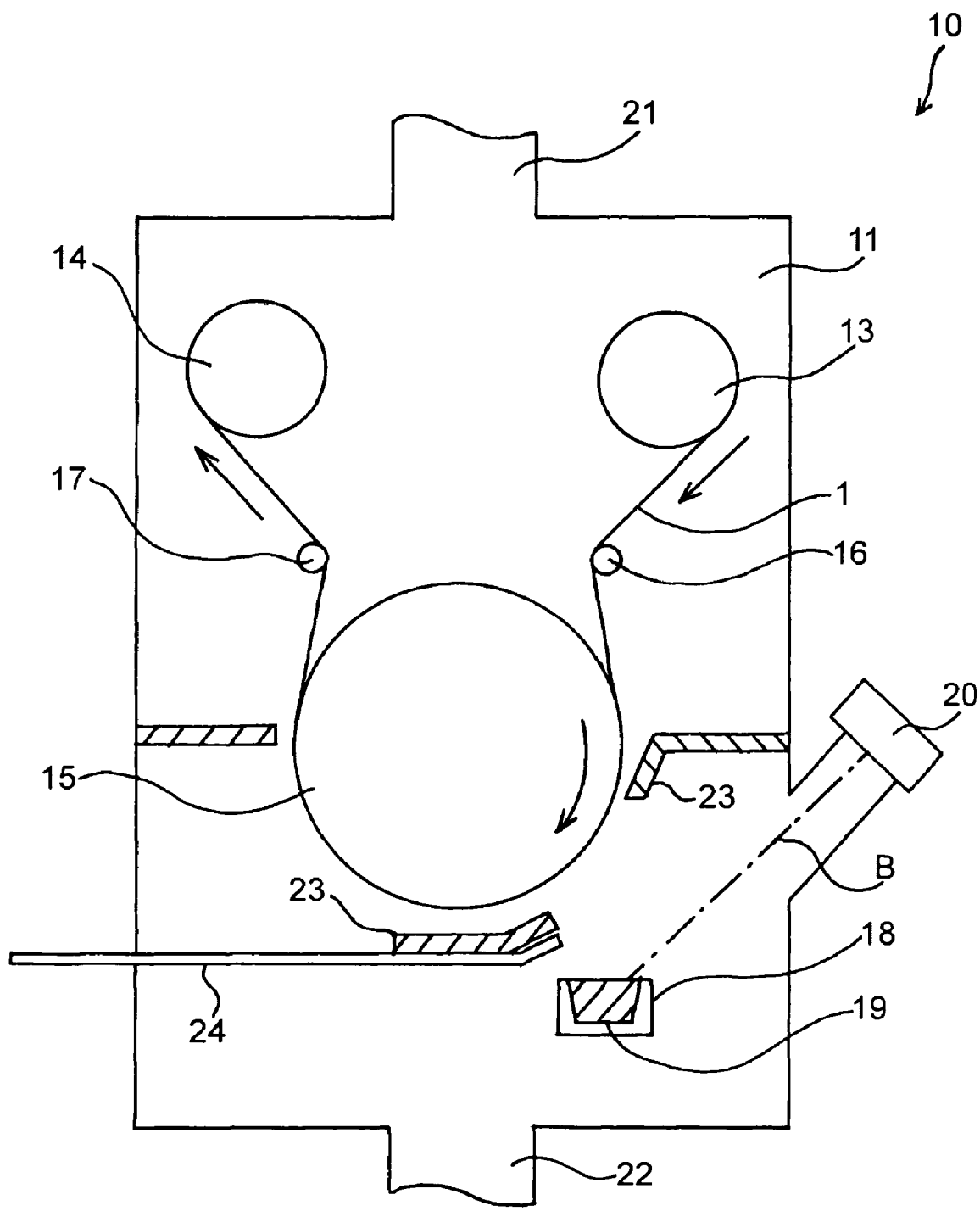
FIG. 2 is a schematic diagram of a deposition apparatus.

FIG. 2 is a schematic diagram of an example of a deposition apparatus for depositing the reinforcing layer 2 of the thin-metal-film magnetic recording medium 100. A deposition apparatus 10 includes a vacuum chamber 11 evacuated through outlets 21 and 22. The vacuum chamber 11 includes a feed roller 13 and a winding roller 14 between which the nonmagnetic support 1 runs sequentially.

The nonmagnetic support 1 runs between the feed roller 13 and the winding roller 14 via a cooling can 15 having a cooling unit (not shown). The cooling can 15 inhibits, for example, thermal deformation due to the temperature rise of the nonmagnetic support 1 when it runs along the circumferential surface of the cooling can 15.

The nonmagnetic support 1 is sequentially fed from the feed roller 13, runs along the circumferential surface of the cooling can 15, and is wound around the winding roller 14. Guide rollers 16 and 17 apply a predetermined tension to the nonmagnetic support 1 so that it can run smoothly.

A crucible 18 containing a deposition material 19 is provided below the cooling can 15 in the vacuum chamber 11. An electron gun 20 for heating and evaporating the deposition material 19 in the crucible 18 is provided on a sidewall of the vacuum chamber 11. The electron gun 20 is positioned so that an electron beam B emitted from the electron gun 20 impinges on the deposition material 19 in the crucible 18. The deposition material 19 is evaporated by irradiation with the electron beam B to adhere to the surface of the nonmagnetic support 1, thus forming the reinforcing layer 2.

In addition to the vacuum deposition described above, the reinforcing layer 2 may be formed by ion plating, in which a deposition material is evaporated by electrical discharge; physical vapor deposition (PVD) processes such as sputtering, in which atoms are sputtered from a target surface by argon ions generated by glow discharge in an atmosphere mainly containing argon; and wet coating processes.

The magnetic layer 3 may be formed directly on the main surface of the nonmagnetic support 1 opposite the reinforcing layer 2 by depositing a ferromagnetic metal. The ferromagnetic metal used may be any known metal or alloy. Examples of the metal used include ferromagnetic metals such as Fe, Co, and Ni; and ferromagnetic alloys such as CoNi, FeCo, FeCoNi, FeCu, CoCu, CoAu, CoPt, MnBi, MnAl, FeCr, CoCr, NiCr, FeCoCr, CoNiCr, and FeCoNiCr. The magnetic layer 3 may be either a monolayer film or a multilayer film of the above ferromagnetic metals.

In addition, an intermediate layer of, for example, Cr may be formed between the nonmagnetic support 1 and the magnetic layer 3 or, if the magnetic layer 3 is a multilayer film, between the sublayers of the magnetic layer 3 to increase the adhesion therebetween and control coercivity, for example. The vicinity of the surface of the magnetic layer 3 may be oxidized to, for example, increase corrosion resistance.

The magnetic layer 3 preferably has a thickness of 20 to 90 nm; the thickness may be adjusted according to the type of playback magnetic head (such as an MR head or a GMR head).

The magnetic layer 3 may be deposited using the deposition apparatus 10 shown in FIG. 2, where the ferromagnetic metal described above is charged into the crucible 18 instead of the deposition material 19. The ferromagnetic metal is evaporated by irradiation with the electron beam B to adhere to the surface of the nonmagnetic support 1, thus forming the magnetic layer 3.

Shutters 23 are provided near the crucible 18 between the cooling can 15 and the crucible 18 so as to cover predetermined areas of the nonmagnetic support 1 running along the circumferential surface of the cooling can 15. These shutters 23 allow the evaporated ferromagnetic metal to be deposited on the nonmagnetic support 1 at an oblique incident angle within a predetermined range.

During the deposition of the magnetic layer 3, an oxygen gas inlet pipe 24 extending into the vacuum chamber 11 through a sidewall thereof supplies oxygen gas to the surface of the nonmagnetic support 1 to improve the magnetic properties, durability, and weather resistance of the magnetic layer 3.

The protective layer 4 is usually formed on the magnetic layer 3 to ensure excellent corrosion resistance and running durability. The protective layer 4 may be formed of any known material that is generally used as the material for a protective layer for protecting a magnetic thin metal film. Examples of the material used include carbon, $CrO_2$, $Al_2O_3$, BN, Co oxide, MgO, $SiO_2$, $Si_3O_4$, $SiN_x$, SiC, $SiN_x$-$SiO_2$, $ZrO_2$, $TiO_2$, TiC, and MoS. The protective layer 4 may be either a monolayer film or a multilayer film. In particular, a carbon protective film excels in durability, corrosion resistance, and productivity.

The protective layer 4 preferably has a thickness of about 4 to 25 nm; an excessively thick protective layer causes a larger spacing loss while an excessively thin protective layer has low wear resistance and low corrosion resistance.

Figure 3:
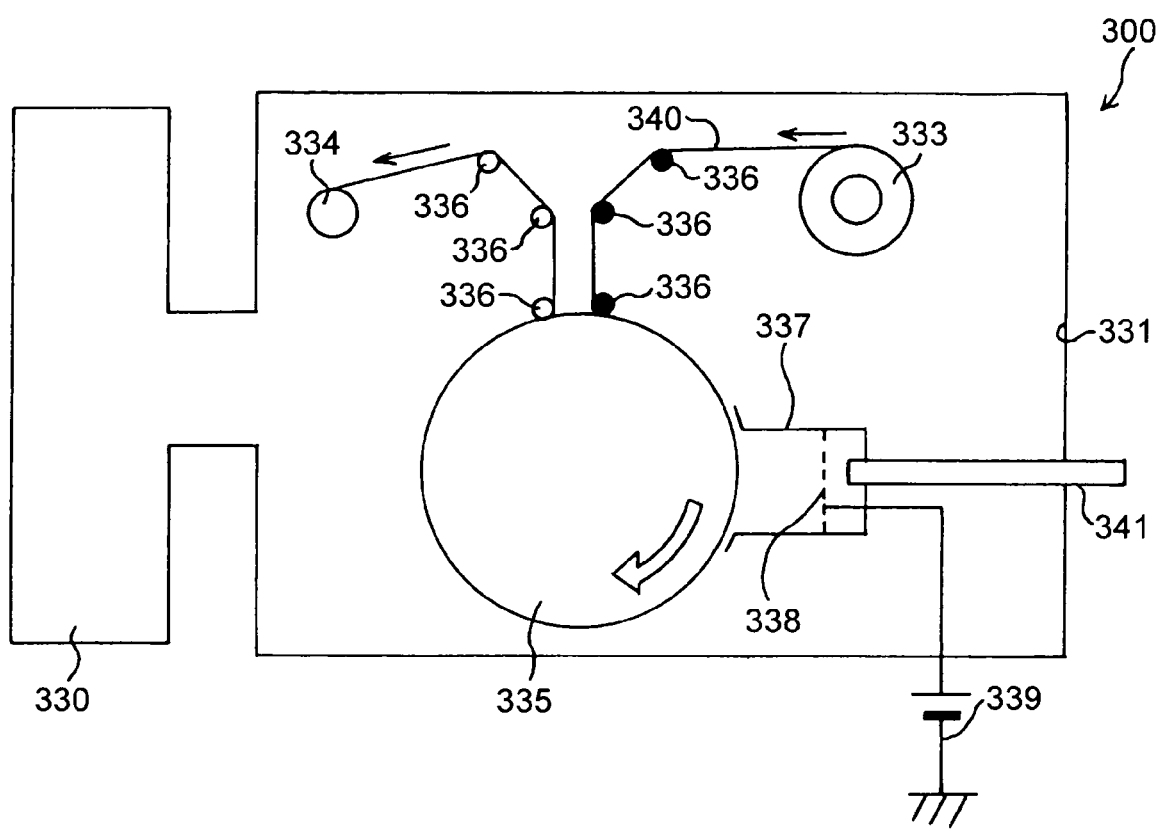
FIG. 3 is a schematic diagram of a plasma-enhanced CVD apparatus for continuous film formation.

The protective layer 4 may be formed by a known vacuum deposition process, for example, by chemical vapor deposition (CVD) using a plasma-enhanced CVD apparatus 300 for continuous film formation shown in FIG. 3.

In FIG. 3, a plasma-enhanced CVD apparatus 300 for continuous film formation includes a vacuum chamber 331 evacuated by an evacuation system 330. The vacuum chamber 331 includes a feed roller 333 and a winding roller 334. A tape 340 including the nonmagnetic support 1, the reinforcing layer 2, and the magnetic layer 3 is sequentially fed from the feed roller 333, runs along the circumferential surface of a cylindrical, rotatable counter electrode can 335, and is wound around the winding roller 334. Guide rollers 336 are disposed between the feed roller 333 and the counter electrode can 335 and between the counter electrode can 335 and the winding roller 334 to apply a predetermined tension to the tape 340 so that it can run smoothly.

A reaction tube 337 formed of, for example, Pyrex® glass or plastic is disposed beside the counter electrode can 335. An end of a discharge gas inlet pipe 341 is inserted into the reaction tube 337 through the bottom thereof, and the other end extends out of the vacuum chamber 331. A deposition gas is introduced into the reaction tube 337 through the discharge gas inlet pipe 341. A discharge electrode 338 formed of, for example, a metal mesh is provided inside the reaction tube 337. An external power supply 339 supplies a predetermined voltage, for example 500 to 2,000 V, to the discharge electrode 338.

In the plasma-enhanced CVD apparatus 300 having the above structure, a voltage is applied to the electrode 338 to cause glow discharge between the electrode 338 and the counter electrode can 335. The deposition gas introduced into the reaction tube 337 is degraded by the glow discharge and is deposited on the tape 340.

A carbon compound gas may be introduced as the deposition gas. The carbon compound gas is degraded in plasma by the above CVD process to stably form a film of hard carbon, called diamond-like carbon, with a thickness of 10 nm or less. This carbon film excels in wear resistance, corrosion resistance, and surface coverage and has a smooth surface and a high dielectric constant.

The carbon compound used may be any known material, such as a hydrocarbon, a ketone, or an alcohol. The carbon compound is degraded in plasma using a high-frequency bias voltage. When plasma is generated, a gas such as Ar or $H_2$ may be introduced to facilitate the degradation of the carbon compound.

The diamond-like carbon film may contain carbon reacted with nitrogen or fluorene to increase film hardness and corrosion resistance, and may be either a monolayer film or a multilayer film. The plasma may be generated with the carbon compound mixed with a gas such as $N_2$, $CHF_3$, $CH_2F_2$, or any mixture thereof.

Figure 4:
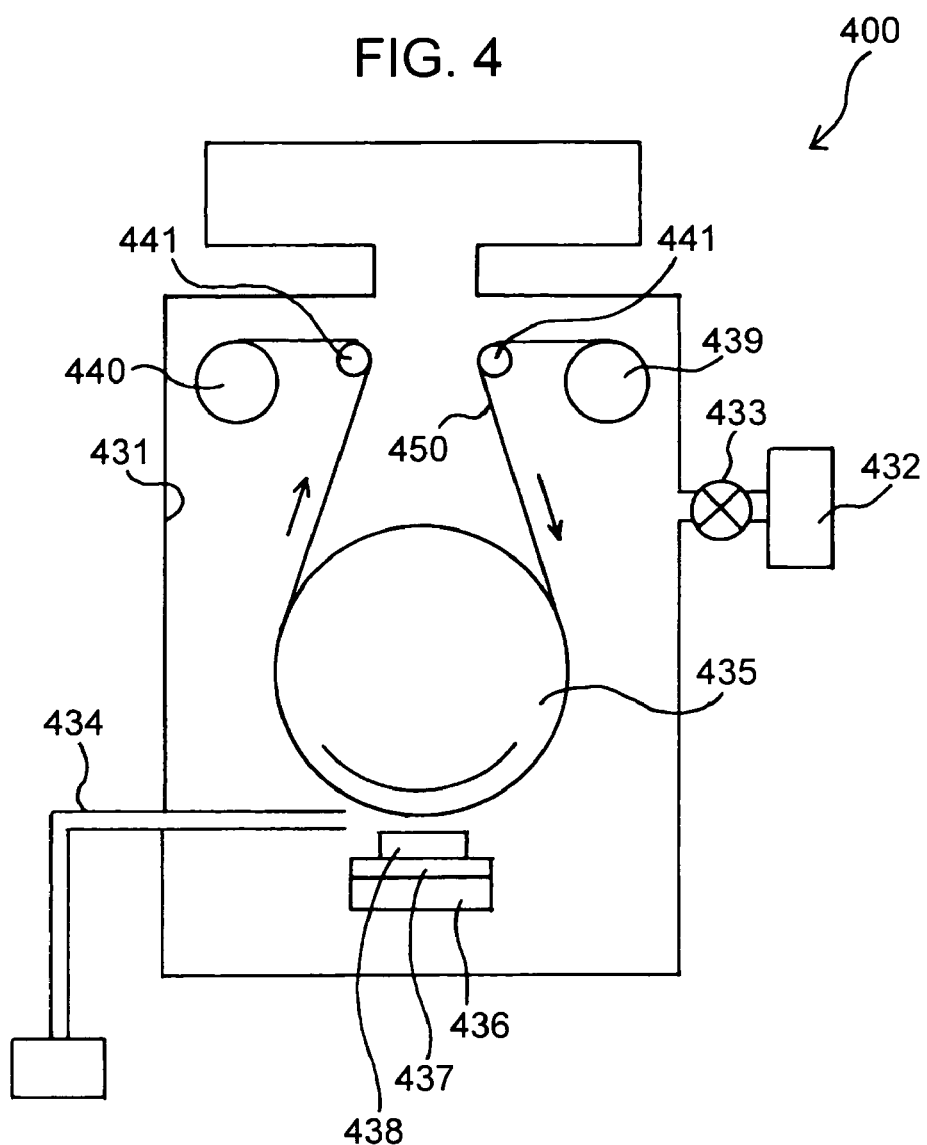
FIG. 4 is a schematic diagram of a magnetron sputtering apparatus.

Alternatively, the protective layer 4 may be deposited using a magnetron sputtering apparatus 400 shown in FIG. 4. The magnetron sputtering apparatus 400 shown in FIG. 4 includes a chamber 431 evacuated by a vacuum pump 432. The chamber 431 includes a feed roller 439 and a winding roller 440 between which a tape 450 including the nonmagnetic support 1, the reinforcing layer 2, and the magnetic layer 3 runs sequentially via a cylindrical, rotatable counter electrode cooling can 435.

Guide rollers 441 are disposed between the feed roller 439 and the cooling can 435 and between the cooling can 435 and the winding roller 440 to apply a predetermined tension to the tape 450 so that it can run smoothly.

A target 436 is disposed opposite the cooling can 435 in the chamber 431. The target 436 is the material for the protective layer 4, for example, carbon.

The target 436 is supported by a backing plate 437 constituting a cathode, and a magnet 438 for creating a magnetic field is disposed on the back surface of the backing plate 437.

In the deposition of the protective layer 4 using the magnetron sputtering apparatus 400, the chamber 431 is evacuated to about $10^{-4}$ Pa by the vacuum pump 432, and its pumping rate is adjusted by controlling a valve 433 for pumping to the vacuum pump 432 side. On the other hand, Ar gas is introduced through a gas inlet pipe 434 to attain a degree of vacuum of, for example, about 0.8 Pa.

While Ar gas is introduced through the gas inlet pipe 434, a voltage of about 3,000 V is applied between the cooling can 435, as an anode, and the backing plate 437, as a cathode, to allow a current of about 1.4 A to flow. The applied voltage converts the Ar gas into plasma, and the resultant ions collide with the target 436 to sputter atoms therefrom.

The ions are collected in the vicinity of the target 436 by the action of the magnetic field created around the target 436 by the magnet 438 disposed on the back surface of the backing plate 437.

The atoms sputtered from the target 436 are deposited on the magnetic layer 3 of the tape 450, which is fed from the feed roller 333 and runs along the circumferential surface of the cooling can 435 in a direction indicated by the arrows shown in the drawing. Thus, the protective layer 4 is deposited on the tape 450, which is wound around the winding roller 440.

The backcoat layer 5 is formed on the reinforcing layer 2, that is, on the surface opposite the magnetic layer 3, to provide running stability. The backcoat layer 5 may be formed of any material that is commonly used. Examples of the material used include carbon, $CrO_2$, $Al_2O_3$, BN, Co oxide, MgO, $SiO_2$, $Si_3O_4$, $SiN_4$, SiC, $ZrO_2$, $TiO_2$, and TiC. The backcoat layer 5 may be either a monolayer film or a multilayer film. The material for the backcoat layer 5 is generally mixed with any organic binder and is applied by coating.

For the thin-metal-film magnetic recording medium 100 according to this embodiment, the lubricating layer 6 is preferably formed on the outermost layer on the magnetic layer 3 side by coating with a lubricant or a rust inhibitor. The lubricant used may be any lubricant that is generally used for magnetic recording media. In particular, lubricants having a fluorocarbon, alkylamine, or alkyl ester backbone, for example, are preferred. The lubricating layer 6 may also be formed on the outermost layer on the backcoat layer 5 side.

The magnetic recording medium 100 having the above structure has a flexural rigidity EI of $5.9 \times 10^{-8}$ to $1.3 \times 10^{-7}$ N·m ($6.0 \times 10^{-4}$ to $1.3 \times 10^{-3}$ g·cm), which is determined by the method described below. The flexural rigidity EI may be controlled according to, for example, the types of materials and thicknesses of the nonmagnetic support 1 and the reinforcing layer 2.

[Method for Determining Flexural Rigidity EI]

While a loop is pressed, a load W (g) in the y direction and a change in diameter are measured. Specifically, a ribbon-like test piece cut from the magnetic recording medium 100 according to this embodiment is used to form a loop having a radius a and a width b with the magnetic surface facing inside, wherein a is about 0.5 to 5 mm and b is about 3 to 8 mm.

Figure 5:
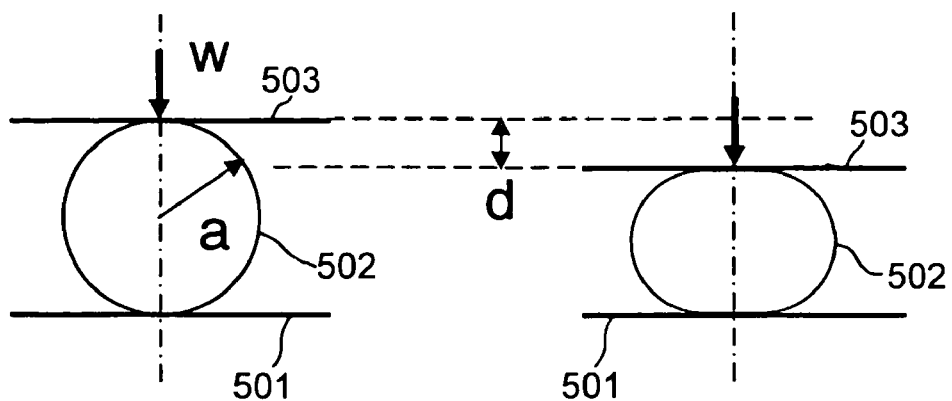
FIG. 5 is a diagram for illustrating a method for measuring flexural rigidity EI.

Referring to FIG. 5, a ribbon-like test piece 502 is held between plates 501 and 503 and is pressed at a predetermined rate, specifically 5 mm/min, and the flexural rigidity EI is determined from the load w (g) at the time when the pressing causes a displacement d of $0.2\pi a$ according to the following equation:

$$EI = (\pi/4 - 2/\pi) \cdot W \cdot a^3/d \cdot b \times 9.8 \times 10^{-5} \quad (1)$$
$$= 0.149 W \cdot a^3 \cdot a \cdot b \times 9.8 \times 10^{-5}$$

In general, the flexural rigidity EI differs between the longitudinal and width directions of the nonmagnetic support 1 wound around a roller before the coating with the magnetic layer 3; the flexural rigidity EI is usually maximized in the longitudinal direction. The flexural rigidity EI herein refers to the value in the longitudinal direction of the nonmagnetic support 1.

If the flexural rigidity EI falls below $5.9 \times 10^{-8}$ N·m ($6.0 \times 10^{-4}$ g·cm), the magnetic recording medium 100 suffers decreased running stability, poor head touch, output decrease, defective envelopes, tape damage such as edge folding and single-side stretching, and increased running noise and jitter. If, on the other hand, the flexural rigidity EI exceeds $1.3 \times 10^{-7}$ N·m ($1.3 \times 10^{-3}$ g·cm), the magnetic recording medium 100 suffers defective RF envelopes, a decreased error rate, and an increased amount of head wear.

Figure 6:
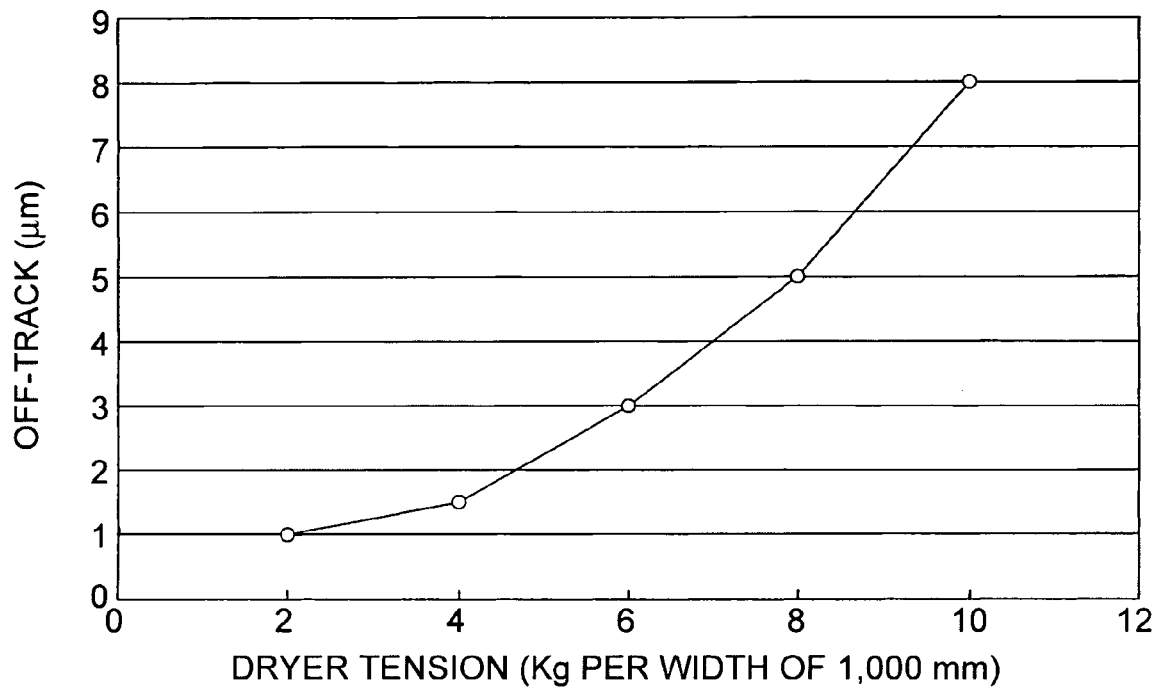
FIG. 6 is a graph showing the relationship between dryer tension and off-track in the preparation of a magnetic recording medium.

According to Patent Document 5, skew (off-track) due to storage is associated with mechanical strength. The results of reexamination, however, show that skew can be controlled by process control though the phenomenon is not completely irrelevant to mechanical strength in terms of the relation with dryer temperature and tension in a wet process for coating the back surface. The reexamination has thus proved that mechanical strength is not a primary factor for skew. FIG. 6 shows the relationship between dryer tension and off-track, where the dryer temperature ranges from 80° C. to 110° C.

The magnetic recording medium 100 preferably has a ten-point average surface roughness SRz of 90 nm or less, more preferably 60 nm or less. As disclosed in Japanese Unexamined Patent Application Publication No. 6-338049, for example, the surface roughness can be controlled by providing large particles on the surface of the nonmagnetic support 1. Alternatively, the nonmagnetic support 1 may be designed so as not to have undesirable coarse particles on the surface thereof, thus controlling the surface roughness of the magnetic recording medium 100.

EXAMPLES

The thin-metal-film magnetic recording medium 100 according to the above embodiment of the present invention is specifically described with examples and comparative examples below, though the present invention is not limited to the examples below.

Example 1

The thickness of the protective layer 4 and the surface roughness were optimized to determine wear properties as one of the main parameters.

(1) Preparation of Samples

PET films with a thickness of 6.3 μm were prepared as the nonmagnetic support 1 and were used to prepare samples having the same structure as the thin-metal-film magnetic recording medium 100 shown in FIG. 1 except that the reinforcing layer 2 was omitted.

The magnetic layer 3 was formed on a main surface of the nonmagnetic support 1 using the deposition apparatus 10 shown in FIG. 2 under the following deposition conditions:
Magnetic metal: 100% by weight of Co
Incident angle: 45° to 10°
Introduced gas: oxygen gas
Amount of oxygen introduced: $3.3 \times 10^{-6}$ m$^3$/sec
Degree of vacuum in deposition: $2.0 \times 10^{-2}$ Pa
Thickness of magnetic layer 3: 180 nm A diamond-like carbon protective layer was then formed on the magnetic layer 3 as the protective layer 4 by plasma-enhanced CVD with varying thicknesses under the following conditions:
Reaction gas: toluene
Reaction gas pressure: 10 Pa
Applied power: direct current (DC) of 1.5 kV
Thickness of protective layer 4: 0 to 50 nm The thickness of the protective layer 4 was measured by direct observation using a transmission electron microscopy (TEM).

The backcoat layer 5 was then formed on the surface opposite the magnetic layer 3 to provide running stability. In this example, a backcoat layer having a thickness of 0.4 μm was formed by applying a mixture of carbon and an organic binder.

(2) Evaluation Method (i) Still Durability

An AIT (trademark of Sony Corporation) SDX-500C drive manufactured by Sony Corporation was modified by incorporating a mechanism for stopping the drive in the same track. Using the drive, read-after-write was performed on each sample. A write operation was performed once at the start of a still mode to determine the playback output as the initial value. The time from the start until the output lowered by 3 dB from the initial value was measured and defined as a still time.

(ii) Measurement of Amount of Head Wear

An impression having a triangular pyramid shape was formed on a head (inductive head) of an AIT SDX-500C drive manufactured by Sony Corporation. While continuous playback was performed by running each sample, the shape of the impression was observed using an optical microscope every ten hours to determine the amount of head wear from observed changes in the size of the impression. The optical microscope was used by calibrating the measurements with a test piece. The microscope used was a MICROPHOT-FXL microscope manufactured by Nikon Corporation, though any microscope may be used.

(iii) Evaluation of Corrosion Resistance

Each sample was stored at 65° C. and 90% RH for 144 hours to measure the residual flux densities (Mr) of the sample before and after the storage, and the degree of deterioration was determined by (1−Mr(after storage)/Mr(before storage))×100 (%). The residual flux densities Mr were measured using a vibrating sample magnetometer (VSM; VSM-C7, manufactured by Toei Industry Co., Ltd.).

(iv) Error Rate

Each sample was run using an AIT SDX-500C drive manufactured by Sony Corporation to measure the block error rate.

Figure 7:
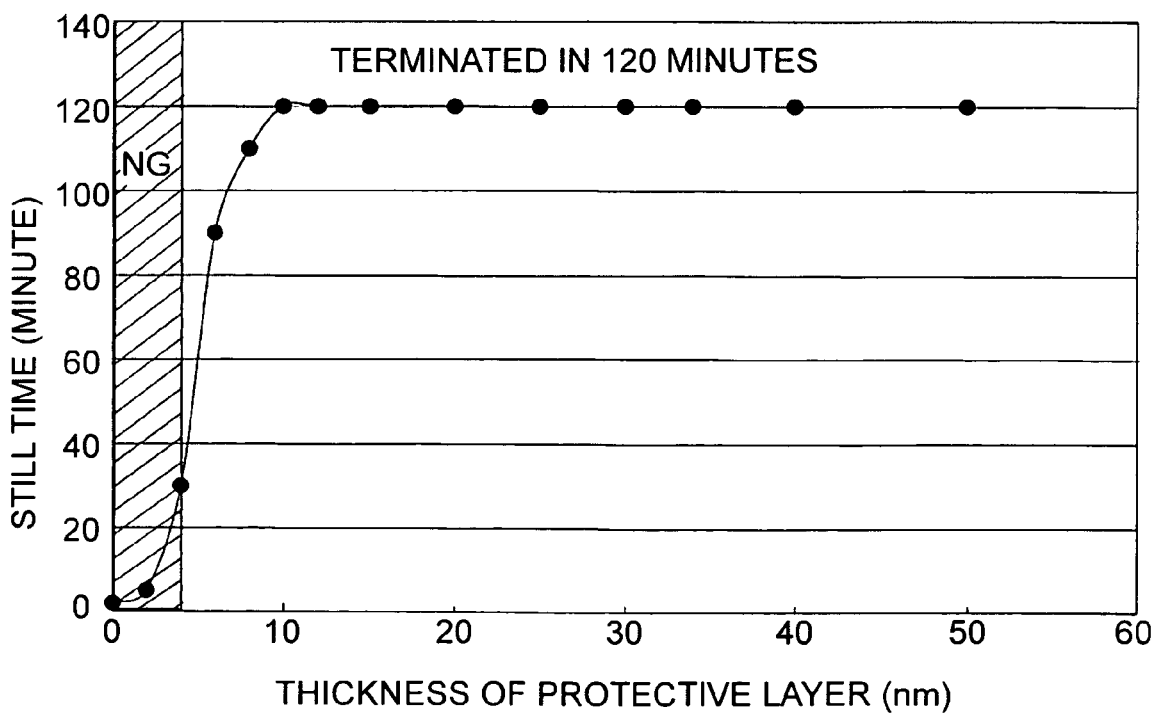
FIG. 7 is a graph showing the relationship between the thickness of a protective layer and still durability.
Figure 8:
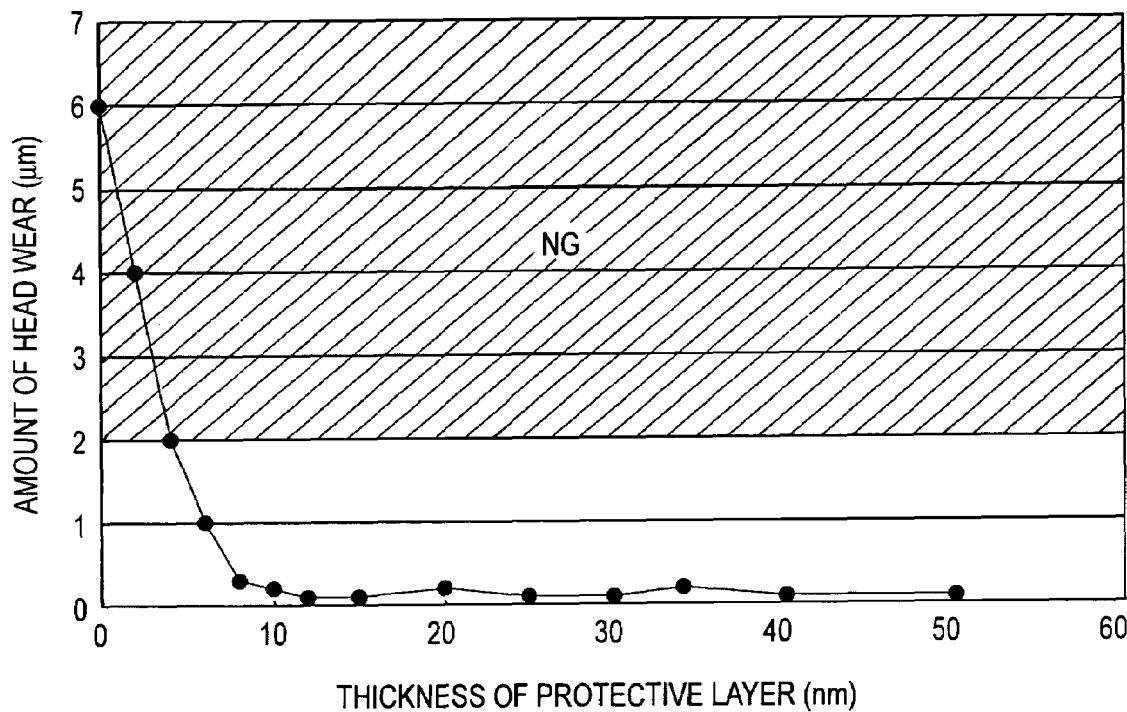
FIG. 8 is a graph showing the relationship between the thickness of a protective layer and the amount of head wear.
Figure 9:
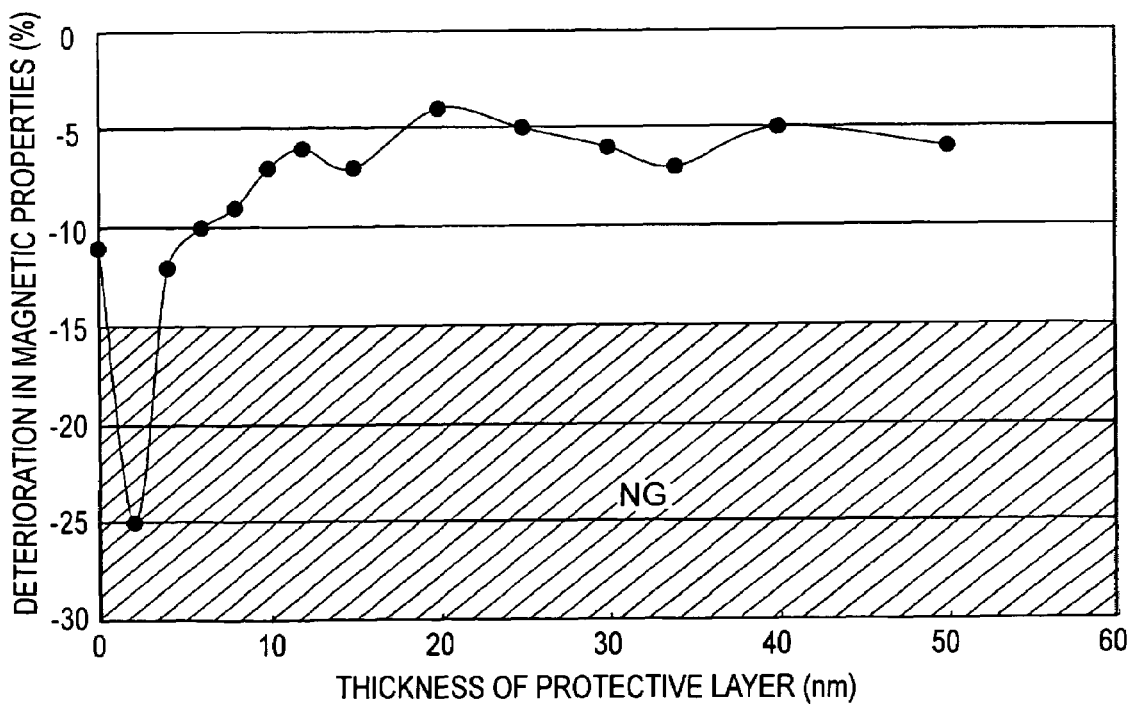
FIG. 9 is a graph showing the relationship between the thickness of a protective layer and deterioration in magnetic properties.

FIG. 7 shows the results of the evaluation for still durability. FIG. 8 shows the measurements of the amount of head wear. FIG. 9 shows the results of the evaluation for corrosion resistance. These results show that magnetic recording media having a protective layer with a thickness less than 4 μm are unacceptable in terms of still durability, corrosion resistance, and wear resistance. In particular, a magnetic recording medium having a protective layer with a thickness of about 2 nm has lower corrosion resistance than that having no protective layer (a thickness of 0 nm). Accordingly, corrosion resistance acceptable for practical use is achieved by forming a protective layer with a thickness of 4 nm or more.

Figure 10:
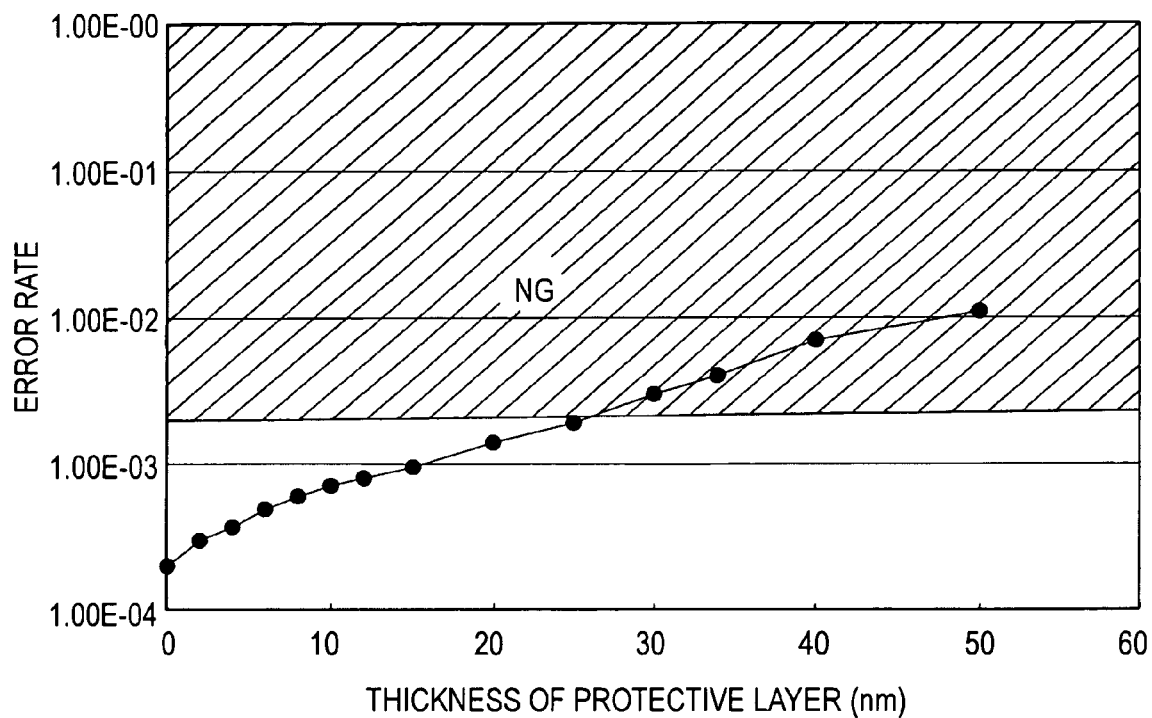
FIG. 10 is a graph showing the relationship between the thickness of a protective layer and error rates.

FIG. 10 shows the relationship between the thickness of the protective layer 4 and the error rate. This graph suggests that unacceptable error rates result if the protective layer 4 has a thickness exceeding 25 nm, and the protective layer 4 preferably has a thickness of 15 nm or less.

Figure 11:
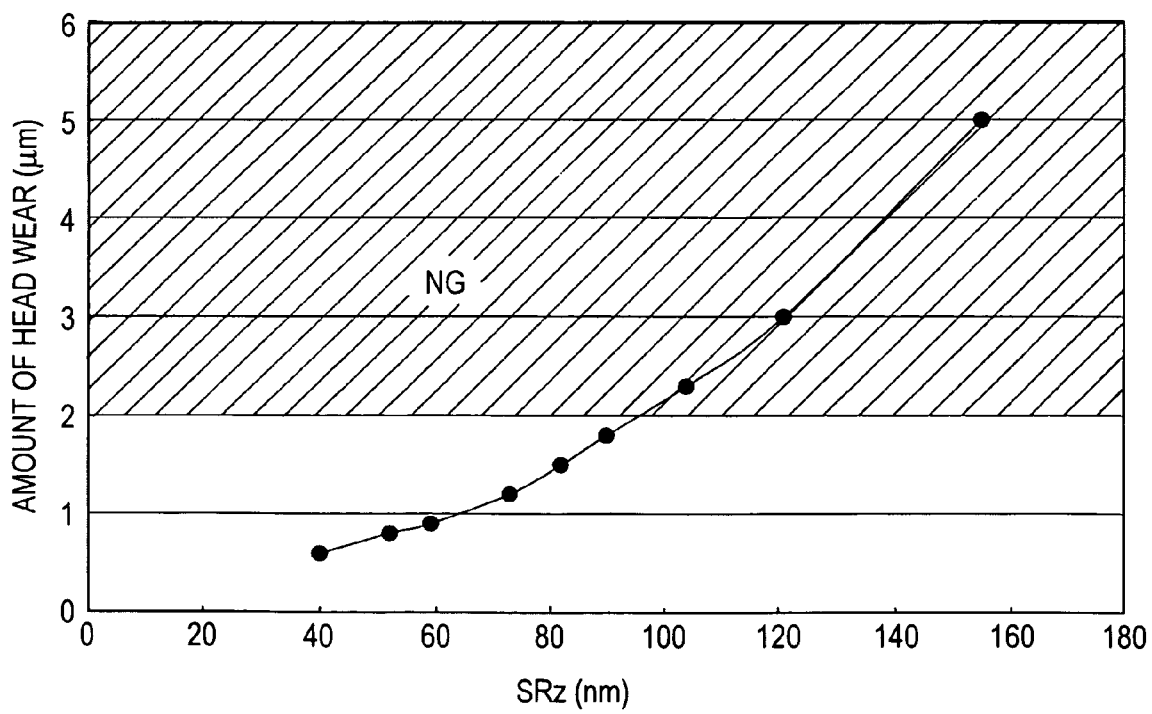
FIG. 11 is a graph showing the relationship between ten-point average surface roughness SRz and the amount of wear of an inductive head.
Figure 12:
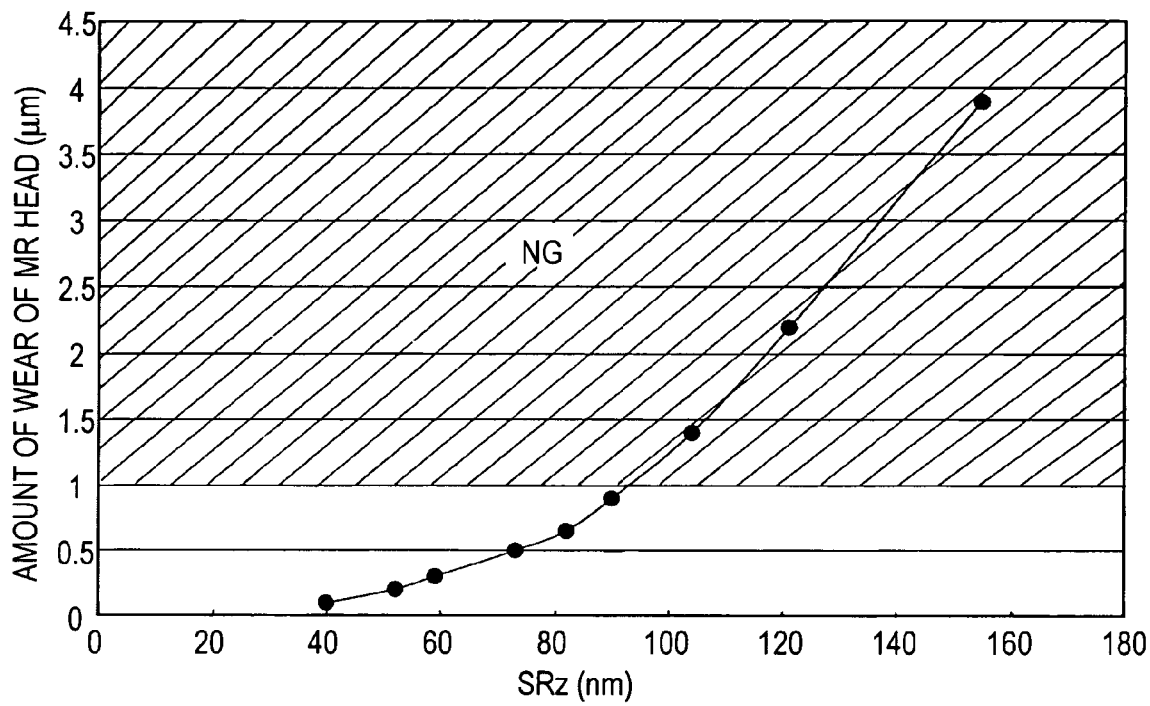
FIG. 12 is a graph showing the relationship between ten-point average surface roughness SRz and the amount of wear of an MR head.

Next, samples were prepared which had carbon protective layers with a thickness of 10 nm (protective layers with a thickness of 10 nm or more have substantially no difference in wear properties, as shown in FIG. 8) and varying ten-point average surface roughnesses SRz to examine the effect of the surface roughness SRz on the amount of wear for an inductive head and an MR head. FIG. 11 shows the measurements of the amount of wear for an inductive head, and FIG. 12 shows the measurements of the amount of wear for an MR head.

FIG. 11 indicates a connection between the surface roughness and the amount of head wear. Accordingly, if an inductive head having a ferrite guard is used, the ten-point average surface roughness SRz is reduced to 90 nm or less, preferably 60 nm or less, to reduce the amount of head wear to an acceptable level.

For an MR head, the acceptable limit of the amount of head wear is 1 μm because the head depth is 3 μm, which is about one-third to one-fourth that of an inductive head. Referring to FIG. 12, the response of the amount of wear of an MR head to changes in ten-point average surface roughness SRz was similar to that of the amount of wear of an inductive head, though the amounts of wear showed slightly different behaviors between an inductive head and an MR head because an MR head has an AlTiC guard. Accordingly, the ten-point average surface roughness SRz of a magnetic recording medium is reduced to 90 nm or less, preferably 60 nm or less, to maintain the wear limit (1 μm).

The above results proved that the thickness of the carbon protective layer 4 and the ten-point average surface roughness are key factors in addition to the mechanical strength. Thus, samples including carbon protective layers with a thickness of 10±1 nm and having a surface roughness SRz ranging from 40 to 50 nm were prepared with varying flexural rigidities EI to examine their properties.

It is known that the thickness of a carbon protective layer and surface roughness can affect wear properties, as mentioned in the description of a cleaning tape in Japanese Unexamined Patent Application Publication No. 2003-85716, assigned to the same assignee as the present application. Nevertheless, the present invention includes the specifications of the thickness of a protective layer and surface roughness because wear properties are also associated with mechanical strength in the present invention.

Example 2

Example 2-1

A PET film with a thickness of 4.5 μm and a width of 150 mm was prepared as the nonmagnetic support 1 and was used to prepare the thin-metal-film magnetic recording medium 100 shown in FIG. 1 under the conditions described below.

The reinforcing layer 2 was formed on a main surface of the nonmagnetic support 1 by vacuum deposition using the deposition apparatus 10 shown in FIG. 2 with Cu as the deposition material 19 under the following deposition conditions:

Deposition material: 100% by weight of Cu
Incident angle: 45° to 10°
Degree of vacuum in deposition: $2.0 \times 10^{-2}$ Pa
Thickness of reinforcing layer 2: 20 nm The magnetic layer 3 was then formed on the other main surface of the nonmagnetic support 1 using the deposition apparatus 10 shown in FIG. 2 under the following deposition conditions:

Magnetic metal: 100% by weight of Co
Incident angle: 45° to 100°
Introduced gas: oxygen gas
Amount of oxygen introduced: $3.3 \times 10^{-6}$ m$^3$/sec
Degree of vacuum in deposition: $2.0 \times 10^{-2}$ Pa
Thickness of magnetic layer 3: 180 nm A diamond-like carbon protective layer was then formed on the magnetic layer 3 as the protective layer 4 by plasma-enhanced CVD under the following conditions:

Reaction gas: toluene
Reaction gas pressure: 10 Pa
Applied power: direct current (DC) of 1.5 kV
Thickness of protective layer 4: 10 nm The order of deposition of the above layers is not limited to the order described above; for example, the magnetic layer 3 and the protective layer 4 may be deposited before the deposition of the reinforcing layer 2.

The backcoat layer 5 was then formed on the layer (the reinforcing layer 2) opposite the magnetic layer 3 to provide running stability. In this example, a backcoat layer having a thickness of 0.4 µm was formed by applying a mixture of carbon and an organic binder.

The magnetic layer 3 and the backcoat layer 5 were then coated with a lubricant. The lubricant used was a fluorocarbon, as a backbone, modified with a tertiary amine. The fluorocarbon used was "DEMNUM™", manufactured by Daikin Industries, Ltd., and dimethyldecylamine was used as the tertiary amine to form a salt structure.

Finally, the resultant magnetic recording medium was cut to a width of 8 mm to prepare a sample.

Examples 2-2 to 2-5

Samples were prepared under the same conditions as in Example 2-1 except that the thickness of the reinforcing layer 2 was 50 nm, 100 nm, 150 nm, or 300 nm.

Examples 2-6 to 2-9

Samples were prepared under the same conditions as in Example 2-1 except that the thickness of the nonmagnetic support 1 was 4.1 µm, and the thickness of the reinforcing layer 2 was 100 nm, 150 nm, 200 nm, or 300 nm.

Example 2-10

A sample was prepared under the same conditions as in Example 2-1 except that the thickness of the nonmagnetic support 1 was 6.3 µm.

Comparative Example 2-1

A sample was prepared under the same conditions as in Example 2-1 except that the reinforcing layer 2 was omitted.

Comparative Examples 2-2 and 2-3

Samples were prepared under the same conditions as in Example 2-1 except that the thickness of the nonmagnetic support 1 was 6.3 µm, and the thickness of the reinforcing layer 2 was 50 nm or 100 nm.

Comparative Examples 2-4 to 2-6

Samples were prepared under the same conditions as in Example 2-1 except that the thickness of the nonmagnetic support 1 was 7.0 µm, the material used for the reinforcing layer 2 was Al, and the thickness of the reinforcing layer 2 was 200 nm, 700 nm, or 1,000 nm.

The samples thus prepared were evaluated according to measurements by the methods described below. The evaluation was performed for RF envelope, RF envelope compatibility, error rate, edge damage, and the amount of head wear using a modified AIT SDX-500C drive manufactured by Sony Corporation.

(1) Flexural Rigidity EI

Samples having a width of 8 mm and a length of 4 mm were used to form loops, as shown in FIG. 5, and the flexural rigidity EI of each sample was determined by the method described above.

(2) Amount of Head Wear

An impression having a triangular pyramid shape was formed on the surface of an inductive head. Continuous playback was performed for 100 hours by running each sample to measure the amount of head wear from a change in the size of the impression after the running. The amount of head wear measured after the 100-hour running was converted into the amount of head wear after 500-hour running. Similarly, the amount of head wear was measured using an MR head having an AlTiC guard as a playback head.

(3) Edge Damage (AIT deck)

After each sample was run for 100 hours, the edges of the sample were observed using an optical microscope (50×, 100×, and 400×) to determine whether edge damage occurred (represented by the symbol 0) or did not occur (represented by the symbol 1).

(4) RF Envelope (AIT Deck)

While each sample was run, 14.3 MHz signals were recorded on the sample. The RF signals were played back to monitor the envelopes thereof using an oscilloscope. The RF envelope was herein defined as the ratio of the width (B) of degraded RF signals to the width (A) of normal RF signals, and was determined by the following equation:

$$RF\ envelope = B/A \times 100\ (\%)$$

Of the widths at the start and end of a track, the lower value was used as the width (B) of the degraded RF signals. In the evaluation, RF envelopes of 80% or more were determined to be good.

(5) RF envelope compatibility (AIT deck)

After each sample was run five times to fit the shape of a head to the sample, the RF envelope was measured using a magnetic recording tape commercially available for use in AIT decks.

(6) Error Rate (AIT Deck)

Each sample was run to measure the block error rate. Table 1 shows the results.

below the substantial limit for practical use, namely a decrease in output of 3 dB (70%), at flexural rigidities EI exceeding $1.3 \times 10^{-7}$ N·m.

TABLE 1

| | | | | | | Evaluation results | | | | | | |
|---|---|---|---|---|---|---|---|---|---|---|---|---|
| | | | | | Flexural rigidity EI | | Amount of head wear | | | | RF | |
| | Support | | Magnetic layer | Reinforcing layer | | | Inductive | MR | | RF | envelope compat- | Error |
| | Material | Thickness (μm) | Thickness (nm) | Material | Thickness (nm) | $\times 10^{-8}$ (N·m) | $\times 10^{-4}$ (g·cm) | head (μm) | head (μm) | Edge damage | envelope (%) | ibility (%) | rate ($\times 10^{-4}$) |
| Example 2-1 | PET | 4.5 | 180 | Cu | 20 | 5.90 | 6.00 | 0.9 | 0.3 | 1 | 82 | 94 | 8.90 |
| Example 2-2 | PET | 4.5 | 180 | Cu | 50 | 6.60 | 6.70 | 0.9 | 0.2 | 1 | 88 | 90 | 6.80 |
| Example 2-3 | PET | 4.5 | 180 | Cu | 100 | 7.80 | 7.90 | 1.2 | 0.5 | 1 | 96 | 86 | 5.15 |
| Example 2-4 | PET | 4.5 | 180 | Cu | 150 | 7.90 | 8.00 | 1.1 | 0.6 | 1 | 92 | 88 | 5.20 |
| Example 2-5 | PET | 4.5 | 180 | Cu | 300 | 12.0 | 12.0 | 1.1 | 0.5 | 1 | 98 | 76 | 4.80 |
| Example 2-6 | PET | 4.1 | 180 | Cu | 100 | 6.70 | 6.80 | 0.9 | 0.5 | 1 | 87 | 85 | 5.90 |
| Example 2-7 | PET | 4.1 | 180 | Cu | 150 | 7.80 | 7.90 | 1.1 | 0.4 | 1 | 95 | 86 | 5.00 |
| Example 2-8 | PET | 4.1 | 180 | Cu | 200 | 7.90 | 8.10 | 0.9 | 0.5 | 1 | 93 | 84 | 5.10 |
| Example 2-9 | PET | 4.1 | 180 | Cu | 300 | 9.20 | 9.40 | 1.1 | 0.6 | 1 | 94 | 83 | 4.90 |
| Example 2-10 | PET | 6.3 | 180 | Cu | 20 | 13.0 | 13.0 | 1.8 | 0.8 | 1 | 92 | 73 | 5.10 |
| Comparative Example 2-1 | PET | 4.5 | 180 | — | 0 | 5.70 | 5.80 | 0.8 | 0.2 | 0 | 54 | 97 | 210 |
| Comparative Example 2-2 | PET | 6.3 | 180 | Cu | 50 | 14.0 | 14.0 | 2.5 | 1.4 | 1 | 89 | 67 | 5.20 |
| Comparative Example 2-3 | PET | 6.3 | 180 | Cu | 100 | 21.0 | 21.0 | 2.8 | 1.6 | 1 | 87 | 56 | 5.00 |
| Comparative Example 2-4 | PET | 7.0 | 180 | Al | 200 | 49.0 | 49.0 | 5.4 | 3.0 | 1 | 75 | 55 | 5.50 |
| Comparative Example 2-5 | PET | 7.0 | 180 | Al | 700 | 70.0 | 70.0 | 5.9 | 3.2 | 1 | 77 | 52 | 6.00 |
| Comparative Example 2-6 | PET | 7.0 | 180 | Al | 1000 | 80.0 | 80.0 | 6.1 | 3.5 | 1 | 74 | 57 | 5.80 |

Figure 13:
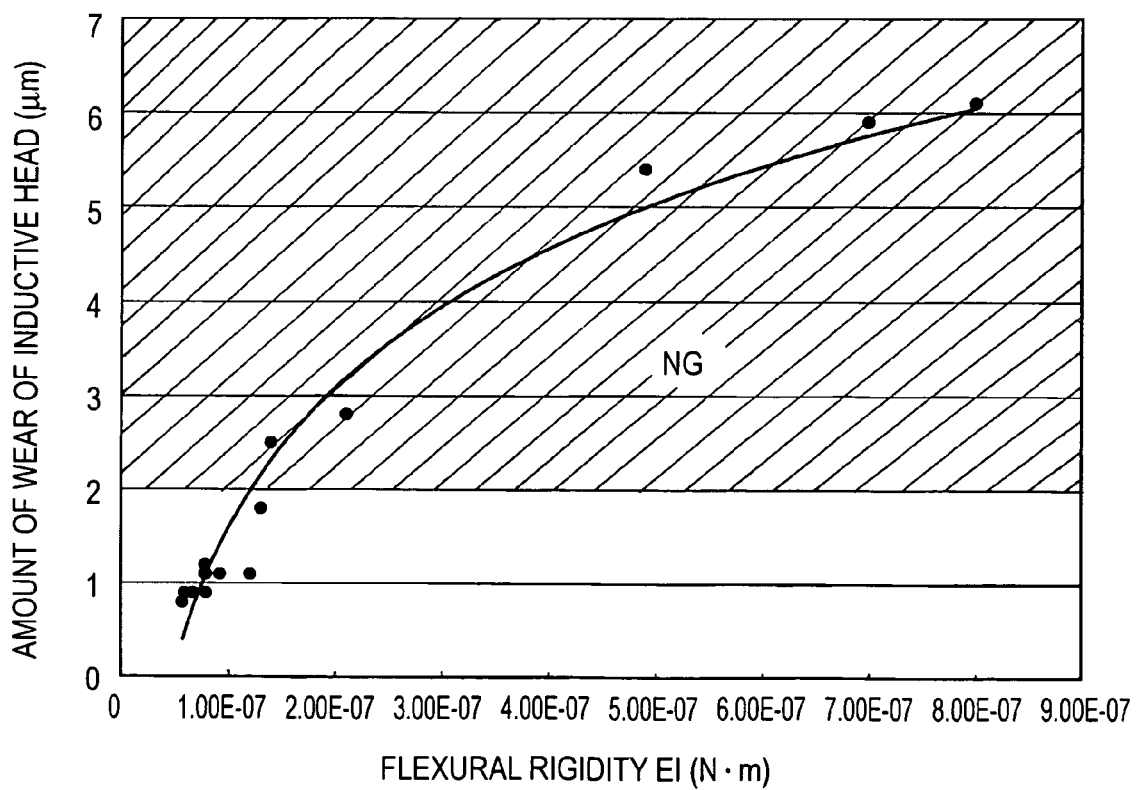
FIG. 13 is a graph showing the relationship between flexural rigidity EI and the amount of wear of an inductive head.

FIG. 13 shows the relationship between flexural rigidity EI, namely mechanical strength, and the amount of wear of an inductive head. If an AIT drive system is used, as is obvious from Table 1 and FIG. 13, magnetic recording media having a flexural rigidity EI exceeding $1.3 \times 10^{-7}$ N·m cause an unacceptable amount of head wear.

Figure 14:
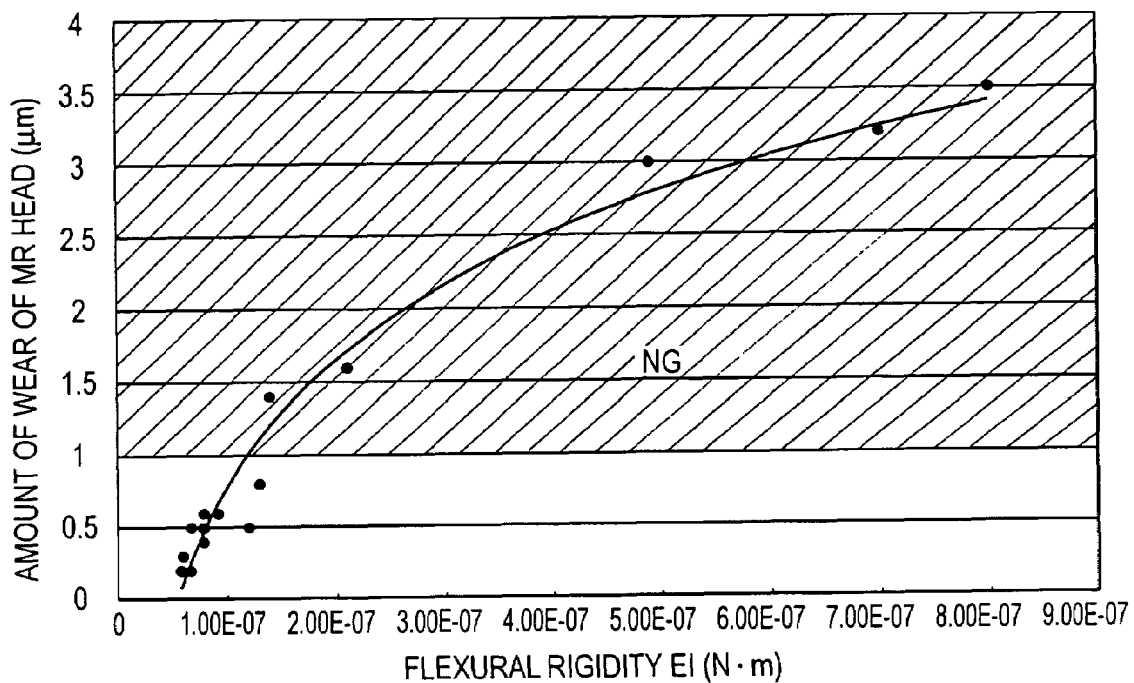
FIG. 14 is a graph showing the relationship between flexural rigidity EI and the amount of wear of an MR head.

FIG. 14 shows the measurements of the amount of head wear for the samples mounted on a similar drive system including an MR head having an AlTiC guard. The amount of head wear of an MR head is preferably reduced to 1 μm or less because the head has a more susceptible structure and system and is thus less tolerant of wear than an inductive head, though the acceptable limit of the flexural rigidity EI lies at about $1.3 \times 10^{-7}$ N·m, as in the case of an inductive head.

Figure 15:
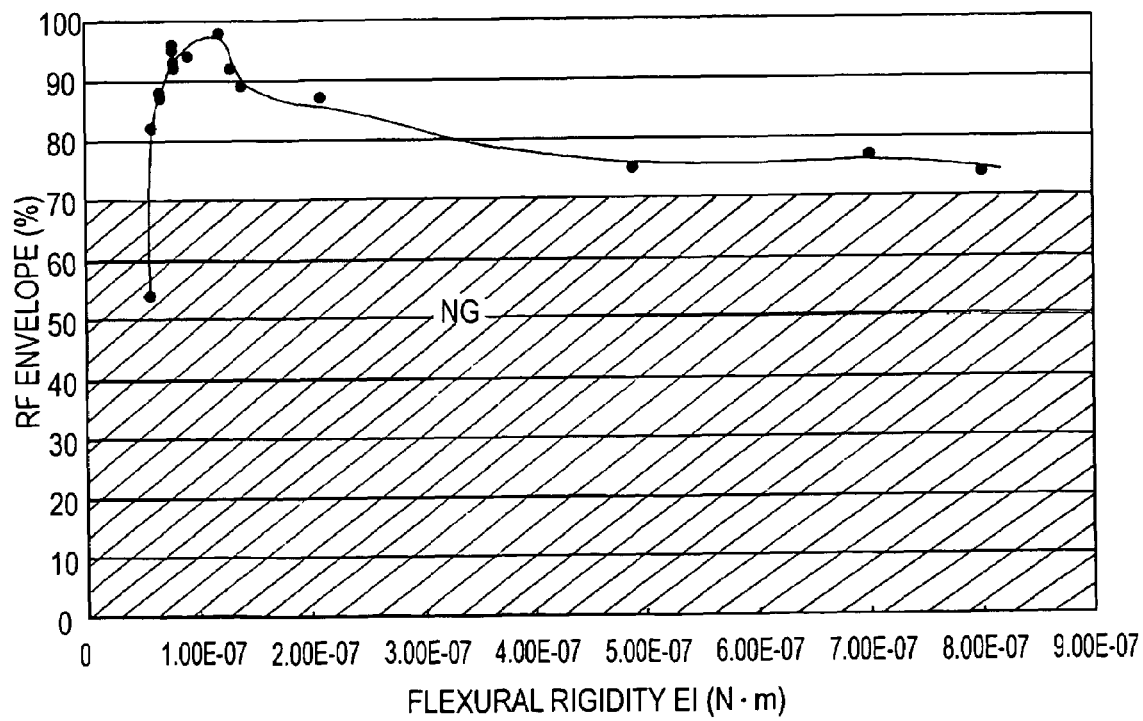
FIG. 15 is a graph showing the relationship between flexural rigidity EI and RF envelopes.

FIG. 15 shows the relationship between the flexural rigidity EI and the RF envelope. This graph shows that magnetic recording media having a flexural rigidity EI less than $5.9 \times 10^{-8}$ N·m are difficult to put to practical use because of insufficient RF envelope output. On the other hand, the RF envelope decreases gradually at higher flexural rigidities EI; however, even magnetic recording media having flexural rigidities EI of about $8 \times 10^{-7}$ N·m are acceptable. Though the upper limit seems to appear, no further examination was performed because any higher flexural rigidity EI causes problems in terms of wear properties and RF envelope compatibility, as described below.

Figure 16:
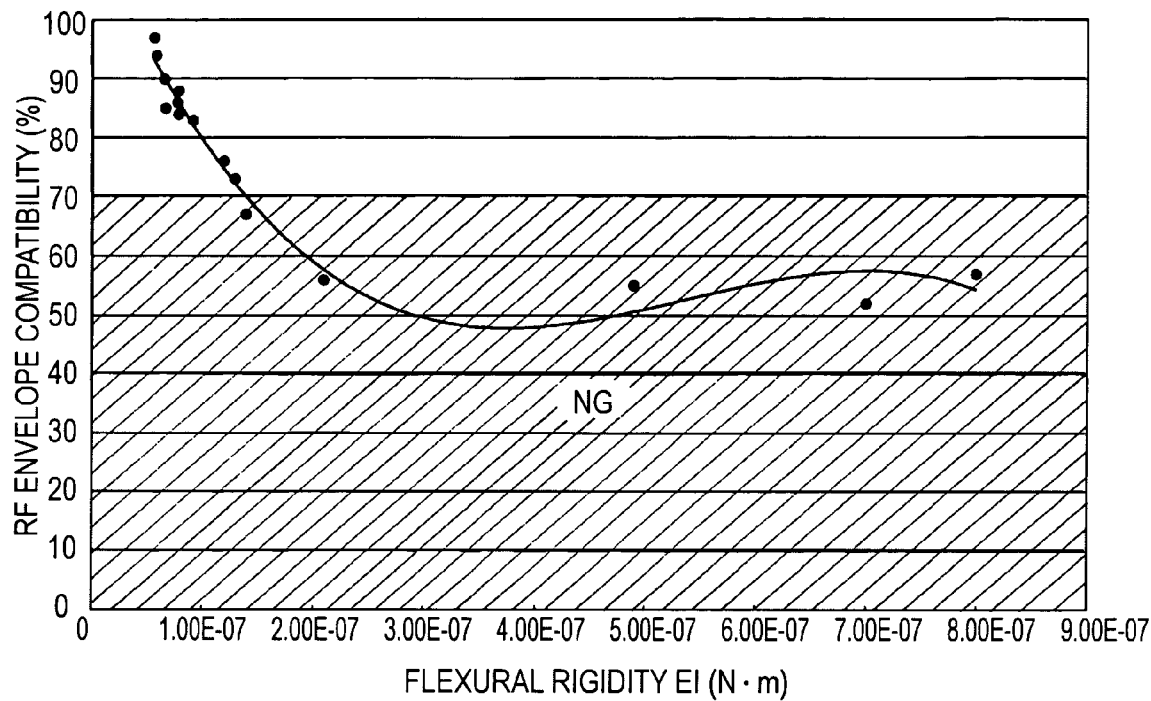
FIG. 16 is a graph showing the relationship between flexural rigidity EI and RF envelope compatibility.
Figure 17:
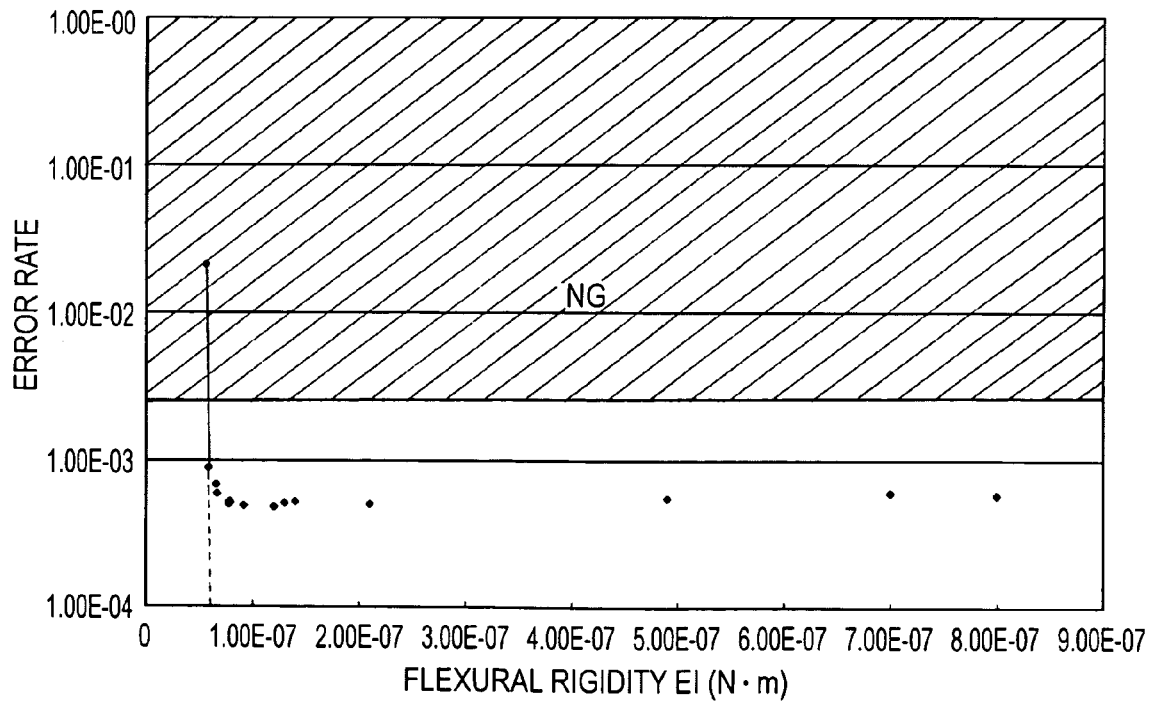
FIG. 17 is a graph showing the relationship between flexural rigidity EI and error rates.

FIG. 16 shows the measurements of the flexural rigidity EI and the RF envelope compatibility. This graph shows that the RF envelope compatibility deteriorates sharply as the flexural rigidity EI is increased. According to the graph, particularly, the RF envelope compatibility deteriorates sharply and falls FIG. 17 shows the relationship between the flexural rigidity EI and the error rate. This graph shows that high error rates result in the region below $5.9 \times 10^{-8}$ N·m which is shown in FIG. 15 because error rates have a strong connection with RF output.

Figure 18:
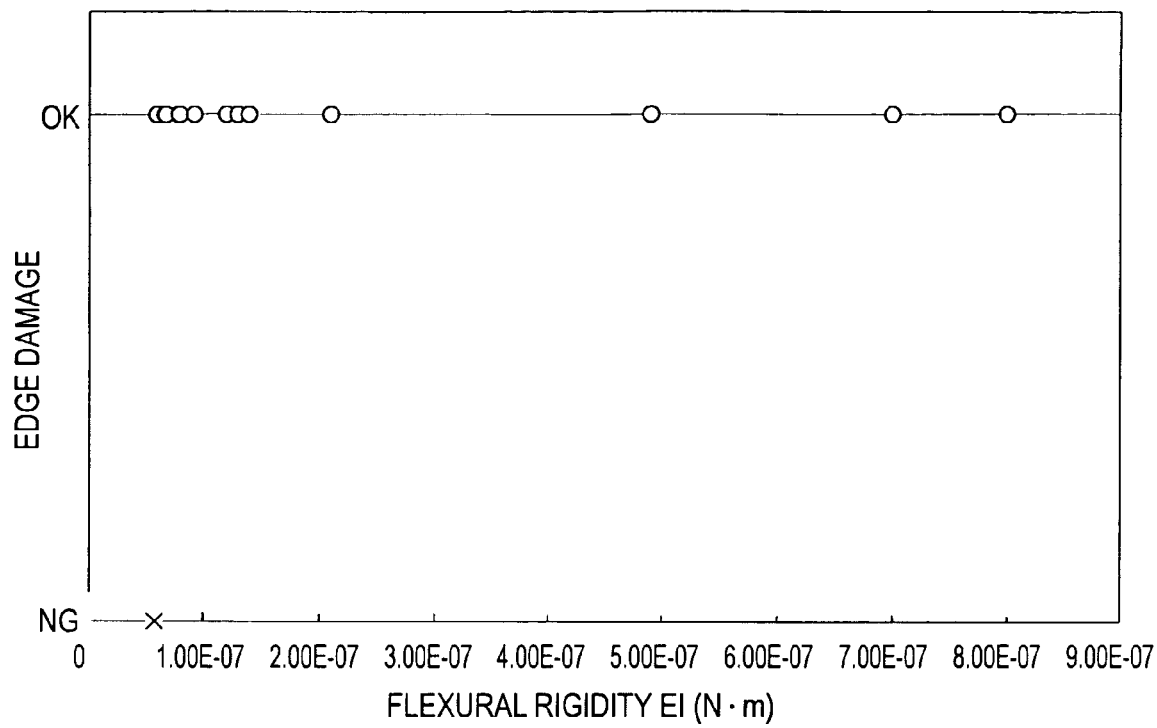
FIG. 18 is a graph showing the relationship between flexural rigidity EI and edge damage.

FIG. 18 shows the relationship between the flexural rigidity EI and the edge damage. This graph shows that edge damage occurred only for flexural rigidities EI less than $5.9 \times 10^{-8}$ N·m.

Example 3

Figure 19:
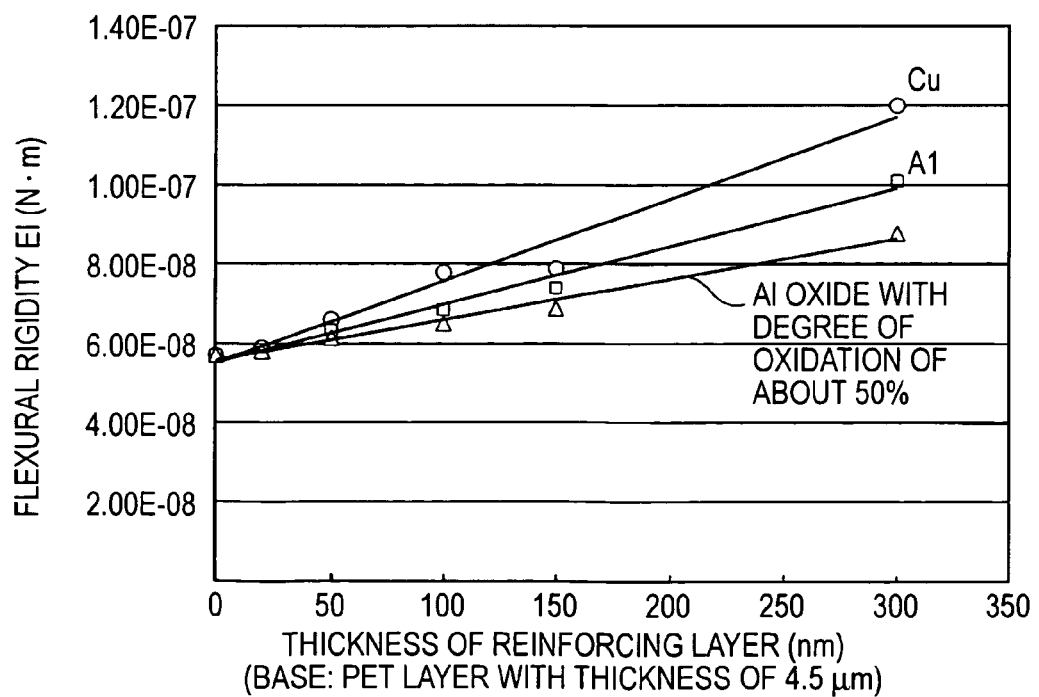
FIG. 19 is a graph showing the relationship between the materials for magnetic layers and flexural rigidity EI.

The relationship between the material for the reinforcing layer 2 and the flexural rigidity EI was examined. Specifically, the flexural rigidity EI was determined in the same manner as in Examples 2-1 to 2-5 except that Al and Al oxide were used as the material for the reinforcing layer 2. The results are shown in FIG. 19. In this graph, the effect of the reinforcing layer 2 corresponds to increases in flexural rigidity EI with increasing thickness of the reinforcing layer 2 because the base strength due to the nonmagnetic support 1 is fixed. This graph shows that the reinforcing effect of Al is about 0.7 times that of Cu, and the reinforcing effect of Al oxide is about 0.50 times that of Cu.

Al oxide had been expected to produce a higher reinforcing effect relative to the thickness of the reinforcing layer 2 than other materials because of its inherent hardness; actually, Al oxide had a lower reinforcing effect than the metals probably because it formed polycrystalline $Al_2O_3$. A higher reinforcing effect may be achieved if a single-crystal $Al_2O_3$ reinforcing film can be formed. In addition, there is a high possibility that Al oxide provides a flexural rigidity EI different from the above data if the ratio of the content of oxide to that of metal is varied. The ratio of the number of Al atoms to that of O atoms is ideally 40:60; the Al oxide used in the above experiment seems to have partially contained elemental Al because the ratio measured by Auger electron spectroscopy (AES) was approximately 50:50. The data in this example is merely reference data showing an example of the advantages of the present invention, and thus does not limit, for example, the thickness of the reinforcing layer 2. No single-crystal $Al_2O_3$ film could be formed with the apparatus used in the example.

The samples of this example were evaluated in the same manner as in Example 2. The results are shown in Table 2.

layer with a thickness less than 40 nm had difficulty in achieving sufficient coercivity Hc for practical use as a magnetic layer for GMR heads, namely 100 kA/m or more, unless an underlying layer, such as a CoO film, was formed. Accordingly, the lower limit of the thickness of the magnetic layer 3 was specified to 40 nm, where Mr·δ was 8 mA.

Figure 20:
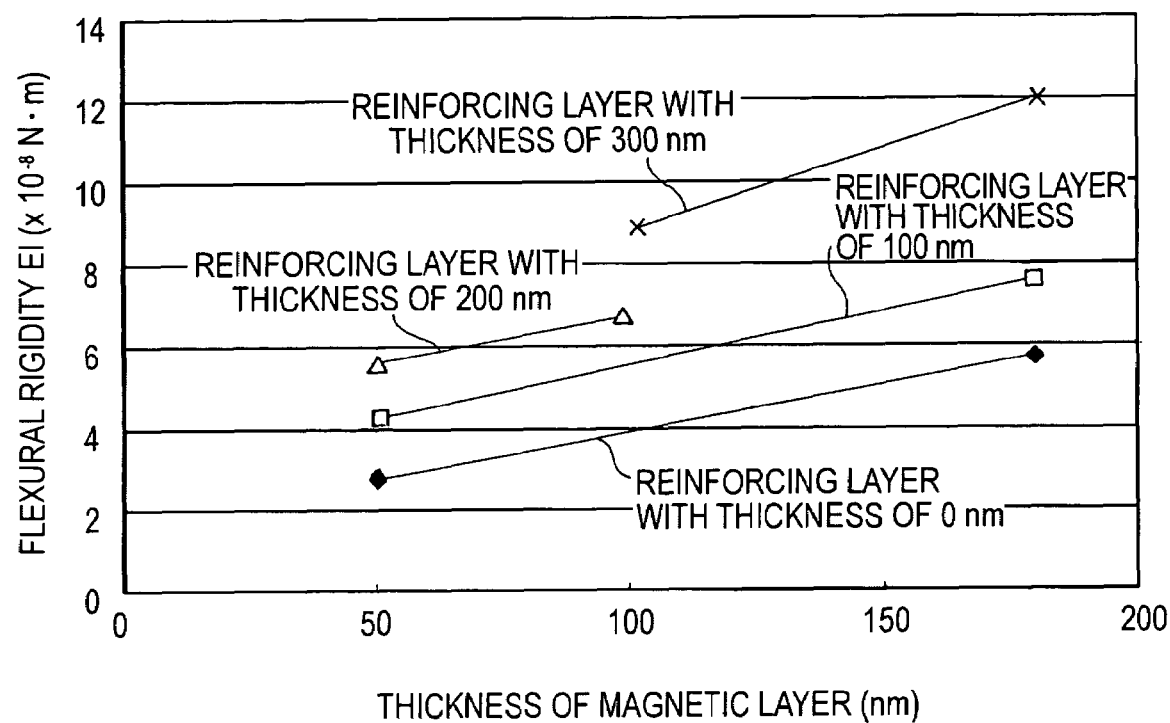
FIG. 20 is a graph showing the relationship between the thickness of a magnetic layer and flexural rigidity EI.

FIG. 20 shows the relationship between the thickness of the magnetic layer 3 and the flexural rigidity EI according to the above results, where the thicknesses of the reinforcing layer 2 and the magnetic layer 3 were varied under the same conditions as in Example 2-1. In the graph, the four lines pass through the points indicating the reinforcing layers having

TABLE 2

| | Support | | Magnetic layer | Reinforcing layer | | Evaluation results | | | | |
|---|---|---|---|---|---|---|---|---|---|---|
| | | | | | | EI | Amount of head wear Inductive | | RF | RF envelope | Error |
| | Material | Thickness (μm) | Thickness (nm) | Material | Thickness (nm) | $\times 10^{-8}$ (N·m) | head (μm) | Edge damage | envelope (%) | compatibility (%) | rate ($\times 10^{-4}$) |
| Comparative Example 2-1 | PET | 4.5 | 180 | — | 0 | 5.70 | 0.8 | 0 | 54 | 97 | 210 |
| Example 2-1 | PET | 4.5 | 180 | Cu | 20 | 5.90 | 0.9 | 1 | 82 | 94 | 8.90 |
| Example 2-2 | PET | 4.5 | 180 | Cu | 50 | 6.60 | 0.9 | 1 | 88 | 90 | 6.80 |
| Example 2-3 | PET | 4.5 | 180 | Cu | 100 | 7.80 | 1.2 | 1 | 96 | 86 | 5.15 |
| Example 2-4 | PET | 4.5 | 180 | Cu | 150 | 7.90 | 1.1 | 1 | 92 | 88 | 5.20 |
| Example 2-5 | PET | 4.5 | 180 | Cu | 300 | 12.0 | 1.1 | 1 | 98 | 76 | 4.80 |
| Comparative Example 3-1 | PET | 4.5 | 180 | Al | 20 | 5.84 | 0.9 | 0 | 77 | 94 | 31.0 |
| Example 3 | PET | 4.5 | 180 | Al | 50 | 6.33 | 0.9 | 1 | 83 | 90 | 8.80 |
| | PET | 4.5 | 180 | Al | 100 | 6.85 | 1.0 | 1 | 89 | 90 | 6.40 |
| | PET | 4.5 | 180 | Al | 150 | 7.40 | 1.1 | 1 | 91 | 88 | 5.50 |
| | PET | 4.5 | 180 | Al | 300 | 10.1 | 1.1 | 1 | 92 | 78 | 5.70 |
| Comparative Example 3-2 | PET | 4.5 | 180 | Al + O | 20 | 5.80 | 0.9 | 0 | 72 | 97 | 51.0 |
| Example 3 | PET | 4.5 | 180 | Al + O | 50 | 6.14 | 0.9 | 1 | 80 | 95 | 11.0 |
| | PET | 4.5 | 180 | Al + O | 100 | 6.51 | 1.0 | 1 | 85 | 93 | 9.80 |
| | PET | 4.5 | 180 | Al + O | 150 | 6.89 | 1.0 | 1 | 89 | 90 | 8.00 |
| | PET | 4.5 | 180 | Al + O | 300 | 8.79 | 1.1 | 1 | 90 | 88 | 5.40 |

Example 4

For magnetic recording media for MR heads, the product of residual magnetization Mr and thickness δ, Mr·δ, is 1 to 5 memu/cm², namely 10 to 50 mA in SI units, according to, for example, Japanese Unexamined Patent Application Publication No. 10-001136. For magnetic recording media for GMR heads, Mr·δ is 0.5 to 1.5 memu/cm², namely 5 to 15 mA in SI units, according to, for example, Japanese Unexamined Patent Application Publication No. 11-190692. Accordingly, the product Mr·δ is roughly 5 to 50 mA for magnetic recording media for MR heads or GMR heads.

To achieve the above product Mr·δ, the thickness δ is adjusted to, for example, 30 to 120 nm according to Japanese Unexamined Patent Application Publication No. 10-001136 and 15 to 60 nm according to Japanese Unexamined Patent Application Publication No. 11-190692. Accordingly, the thickness of the magnetic layer 3 is roughly 15 to 120 nm.

Samples having magnetic layers with thicknesses of 35 nm, 50 nm, 90 nm, and 120 nm were prepared and evaluated for coercivity (Hc). According to the evaluation, the sample having a magnetic layer with a thickness less than 40 nm exhibited significantly low coercivity (Hc). The magnetic different thicknesses (none (0 nm), 100 nm, 200 nm, and 300 nm). This graph shows that the flexural rigidity EI tends to increase in proportion to the thickness of the reinforcing layer 2.

A magnetic recording medium according to an embodiment of the present invention, as described above, includes a plastic film having a thickness less than 7 μm and a width of 8 mm, a magnetic layer formed of a ferromagnetic metal thin film containing Co and O and disposed on a surface of the plastic film, a reinforcing layer disposed on the other surface of the plastic film, a backcoat layer, and a carbon protective layer having a thickness of 4 to 25 nm. The magnetic recording medium has a ten-point average surface roughness SRz of 90 nm or less and a flexural rigidity EI of $5.9 \times 10^{-8}$ to $1.3 \times 10^{-7}$ N·m ($6.0 \times 10^{-4}$ to $1.3 \times 10^{-3}$ g·cm). The results of the above examples demonstrate that, when used for a system having a tape width of 8 mm, the magnetic recording medium can provide better RF envelopes and lower error rates to achieve high capacity, high performance, and high reliability.

It should be understood by those skilled in the art that various modifications, combinations, sub-combinations and alterations may occur depending on design requirements and other factors insofar as they are within the scope of the appended claims or the equivalents thereof.

What is claimed is:

1. A magnetic recording medium comprising:
a nonmagnetic support having a thickness less than 4.5 μm and a width of 8 mm;
a ferromagnetic metal layer on a surface of the nonmagnetic support;
a carbon protective film layer including a ferromagnetic metallic material on the ferromagnetic metal layer;
a reinforcing layer on the other surface of the nonmagnetic support; and
a back coating layer under the reinforcing layer,
wherein,
the magnetic recording medium has a flexural rigidity EI of $5.9 \times 10^{-8}$ to $1.3 \times 10^{-7}$ N·m when the flexural rigidity EI of the magnetic recording medium is determined by the following equation:

$$EI=(\pi/4-2/\pi)W \cdot a3/d \cdot b \times 9.8 \times 10^{-5},$$

where W is a load that causes an annular test piece having a radius of a cm and a width of b cm which is prepared by cutting a magnetic sheet formed of the magnetic recording medium to undergo a radial displacement d of $0.2\pi \cdot a$.

2. The magnetic recording medium according to claim 1, wherein the reinforcing layer is formed of a material selected from the group consisting of metals, metalloids, alloys, oxides thereof, and compounds thereof.

3. The magnetic recording medium according to claim 1, wherein the reinforcing layer has a thickness of 20 to 300 nm.

4. The magnetic recording medium according to claim 1, wherein the carbon protective film layer has a thickness of 4 to 25 nm.

5. The magnetic recording medium according to claim 1, wherein the carbon protective film layer has a ten-point average surface roughness SRz of 90 nm or less.

* * * * *